US008209633B1

(12) United States Patent
Eismann et al.

(10) Patent No.: US 8,209,633 B1
(45) Date of Patent: Jun. 26, 2012

(54) GENERATING A TIMELINE FOR TRANSITIONS BETWEEN STATES

(75) Inventors: Ethan A. Eismann, Oakland, CA (US); Robert Tyler Voliter, San Jose, CA (US); Robin James Adams, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 939 days.

(21) Appl. No.: 12/242,873

(22) Filed: Sep. 30, 2008

(51) Int. Cl.
*G06F 3/048* (2006.01)

(52) U.S. Cl. ......... 715/835; 715/733; 715/765; 345/473

(58) Field of Classification Search .................. 715/726, 715/762, 763, 764, 765, 835, 838, 967; 345/473; 348/578; 717/116
See application file for complete search history.

(56) References Cited

U.S. PATENT DOCUMENTS

| | | | |
|---|---|---|---|
| 5,359,712 A | 10/1994 | Cohen et al. | |
| 5,642,511 A | 6/1997 | Chow et al. | |
| 5,742,848 A | 4/1998 | Burgess | |
| 5,801,687 A * | 9/1998 | Peterson et al. | 715/201 |
| 5,862,372 A | 1/1999 | Morris et al. | |
| 5,862,379 A | 1/1999 | Rubin et al. | |
| 5,999,173 A | 12/1999 | Ubillos | |
| 6,396,520 B1 * | 5/2002 | Ording | 715/798 |
| 6,414,686 B1 | 7/2002 | Protheroe et al. | |
| 6,469,723 B1 * | 10/2002 | Gould et al. | 715/837 |
| 6,512,522 B1 | 1/2003 | Miller et al. | |
| 6,564,368 B1 | 5/2003 | Beckett et al. | |
| 6,823,495 B1 | 11/2004 | Vedula et al. | |
| 7,159,185 B1 | 1/2007 | Vedula et al. | |
| 7,240,328 B2 | 7/2007 | Beckett et al. | |
| 7,398,002 B2 | 7/2008 | Hsiao et al. | |
| 7,554,542 B1 * | 6/2009 | Ferraro et al. | 345/427 |
| 7,805,678 B1 | 9/2010 | Niles et al. | |
| 7,917,861 B2 * | 3/2011 | Boettcher et al. | 715/765 |
| 7,966,577 B2 * | 6/2011 | Chaudhri et al. | 715/835 |
| 2003/0002851 A1 | 1/2003 | Hsiao et al. | |
| 2006/0132482 A1 | 6/2006 | Oh | |
| 2006/0214935 A1 | 9/2006 | Boyd et al. | |
| 2007/0089152 A1 | 4/2007 | Patten et al. | |

OTHER PUBLICATIONS

"Key Frame", [Online]. Retrieved from the Internet: <URL:http://en.wikipedia.org/w/index.php?title=Key_frame&printable=yes>,(Sep. 18, 2008),3 pgs.

"Microsoft Expression Blend", [Online]. Retrieved from the Internet: <http://en.wikipedia.org/wiki/Microsoft_Expression_Web>,(Sep. 18, 2008),1 pg.

(Continued)

*Primary Examiner* — Xiomar L Bautista
(74) *Attorney, Agent, or Firm* — Schwegman, Lundberg & Woessner, P.A.

(57) ABSTRACT

A method is illustrated that comprises displaying a first visual representation of a set of object properties of a plurality of objects, and a second visual representation of a set of object properties of the plurality of objects, each object of the plurality of objects having a property. The method further includes receiving input selecting an object of the plurality of objects having the property, the property displayed as a transition of the selected object from the first visual representation to the second visual representation. The method additionally includes sorting the plurality of objects based upon the selected object to create a sorted plurality of objects. Further, the method includes generating transition timeline data that includes the sorted plurality of objects.

25 Claims, 21 Drawing Sheets

OTHER PUBLICATIONS

"U.S. Appl. No. 12/242,878, Restriction Requirement mailed Oct. 12, 2011", 7 pgs.

"U.S. Appl. No. 12/271,868, Non-Final Office Action mailed Oct. 12, 2011", 16 pgs.

* cited by examiner

GENERATING A TIMELINE FOR TRANSITIONS BETWEEN STATES

COPYRIGHT

A portion of the disclosure of this document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright© 2008, Adobe Systems Incorporated. All Rights Reserved.

TECHNICAL FIELD

The present application relates generally to the technical field of algorithms and programming and, in one specific example, Graphical User Interfaces (GUIs)

BACKGROUND

A GUI builder is a software development tool that simplifies the creation of GUIs by allowing a GUI designer to arrange objects using a drag-and-drop What You See is What You Get (WYSIWYG) editor. A GUI builder may be used in conjunction with an Integrated Development Environment (IDE). Some well known GUI builders includes Microsoft Corporation's EXPRESSION BLEND™, GLADE INTERFACE DESIGNER™, and Apple Corporation's COCOA™.

BRIEF DESCRIPTION OF THE DRAWINGS

Some embodiments are illustrated by way of example and not limitation in the figures of the accompanying drawings in which.

DETAILED DESCRIPTION

Figure 1:
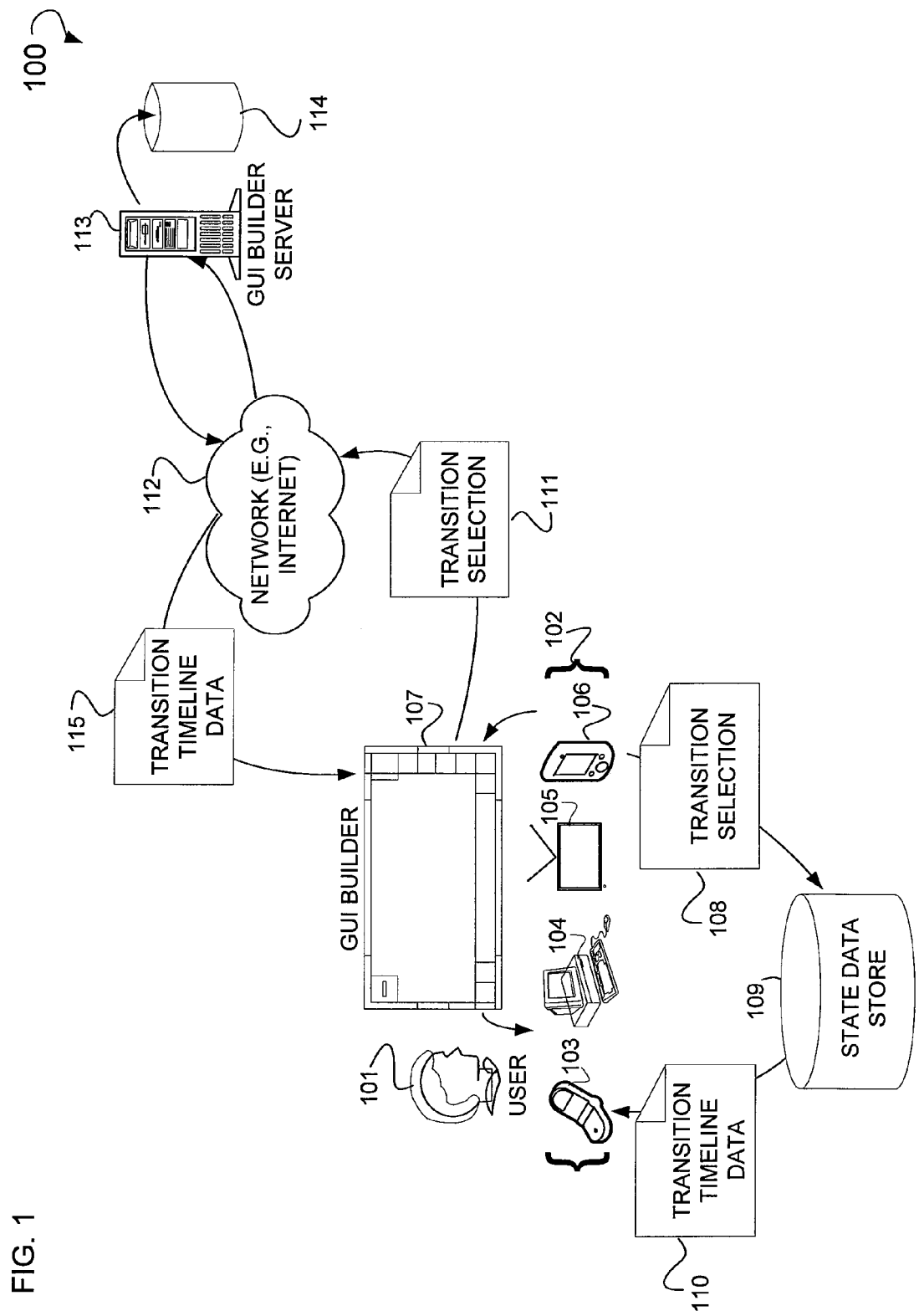
FIG. 1 is a diagram of a system, according to an example embodiment, used to generate a transition selection and to receive transition timeline data.

In the following description, for purposes of explanation, numerous specific details are set forth in order to provide a thorough understanding of an example embodiment of the present invention. It may be evident, however, to one skilled in the art that the present invention will be practiced without these specific details.

In some example embodiments, a system and method are illustrated for implementing properties for objects associated with one or more states. A property is a visual effect or audio effect. These properties may be displayed as a transition between two or more states. In one example embodiment, the properties are user selected. In a further example embodiment, the properties are selected by default based upon the differences between objects associated with the two or more states. A visual effect is a visually perceptible attribute associated with an object. An audio effect is an auditorily perceptible attribute associated with an object. For illustrative purposes only, visual effects will be referenced herein. Example visual effects include a move effect, a wipe effect, a resize effect, a fade-in effect, a fade-out effect, or some other suitable effect. These visual effects may occur over time, or due to the occurrence of an event. An object is a visually displayed icon that has attributes and/or methods associated with it. Collectively, object attributes and methods are referred to as object properties. Example objects include a component, a widget, a user interface control, a layer, a group, a graphic artwork/icon, text, or a path. A state is a set of object properties. A state may be dynamic and may change over time, or due to the occurrence of an event. A transition is a set of visual effects. In some cases, transitions between states are visually displayed. A state is displayed as part of a display area in a GUI. In some example embodiments, a visual effect transforms the object property from one state to another within the GUI. A display area may be a frame or sub-frame of the GUI.

In one example embodiment, the visual effects are user selected through the use of a transition timeline display area. User selected includes the use of an input device and associated functionality. An input device may be a keyboard, mouse, light pen, touch screen, or other suitable input device. The associated functionality of the input device includes a right-click function, a mouse-over function, a left-click function, or some other suitable function. The transition timeline display area includes a track list. A track list is a table that includes columns for states, columns for visual effects and the transitions association therewith. Each entry (e.g., row) in the track list is an object associated with a state. Further included as part of the entry in the track list is a start target in the form of an object, an end target in the form of an object. A track in the track list includes a visual effects bar(s) representing the transition between the start target and the end target. Further included, is an object icon, and a selection mechanism for selecting the object to associate with a state. A selection mechanism is a mechanism to associate an object with a state. Example selection mechanisms include a check box, radio button, or other suitable selection mechanisms. Also included in the timeline display area is a transition timeline used to set a time or event after the expiration or occurrence of which a transition will be complete. In some example embodiments, as will be more fully illustrated below, the organization of the track list may be dictated by various state and object combinations.

In some example embodiments, the visual effects are selected by default based upon the differences between objects associated with the two or more states. A visual effect selected by default is a visual effect selected through the selection of a start state and an end state, where the properties (e.g., the visual effect) of objects not in common between the states are used as the basis for generating the visual effects between the states. A set operation may be used to determine an object not in common between the states, where this set operation may be a union (U), intersection (∩), set difference (−), Cartesian product (x), or some other suitable set operation. In some example embodiments, a combination of set operations may be used to an object not in common between the states. In some example embodiments, visual effects are configured such that the set of differences between two states can be recalculated to update the visual effects.

Example System

FIG. 1 is a diagram of an example system 100 used to generate a transition selection and to receive transition timeline data. Shown is a user 101 utilizing any one of a number of devices 102 to generate a transition selection 111. The devices 102 include a cell phone 103, a computer system 104, a television or monitor 105, a Personal Digital Assistant (PDA) 106 or a smart phone (not shown). The transition selection 111 is generated through the use of a GUI builder 107. This transition selection 111 is transmitted by one of the devices 102 across a network 112, and is formatted using an eXtensible Markup Language (XML), a Macromedia-XML (MXML), ActionScript, JavaScript, HyperText Markup Language (HTML), or some other suitable format. The transition selection 111 is received by a GUI builder server 113. Communicatively coupled to the GUI builder server 113 is a database 114. Communicatively coupled may include a physical or logical connection between the GUI builder server 113 and the database 114. Further, this database 114 may reside native or non-natively on the GUI builder server 113. The GUI builder server 113 retrieves transition timeline data 115 from the database 114, and/or may generate this transition timeline data 115 through the methods and operations discussed below. The transition timeline data is formatted as XML, MXML, ActionScript, HTML, or some other suitable language. This transition timeline data 115 is transmitted back across the network 112 and received by one of the devices 102 for display within the GUI builder 107.

In some example embodiments, a transition selection 108 is transmitted by one of the devices 102 to a database 109. The transition selection 108 may be formatted as a database query using a Structured Query Language (SQL), or some other suitable format. A transition timeline data 110 is retrieved by one of the devices 102 and processed and displayed within the GUI builder 107. This transition timeline data 110 may be formatted using XML, MXML, ActionScript, HTML, or some other suitable language. In some example embodiments, the database 109 may be a native or non-native database that is communicatively coupled to one of the devices 102.

Figure 2:
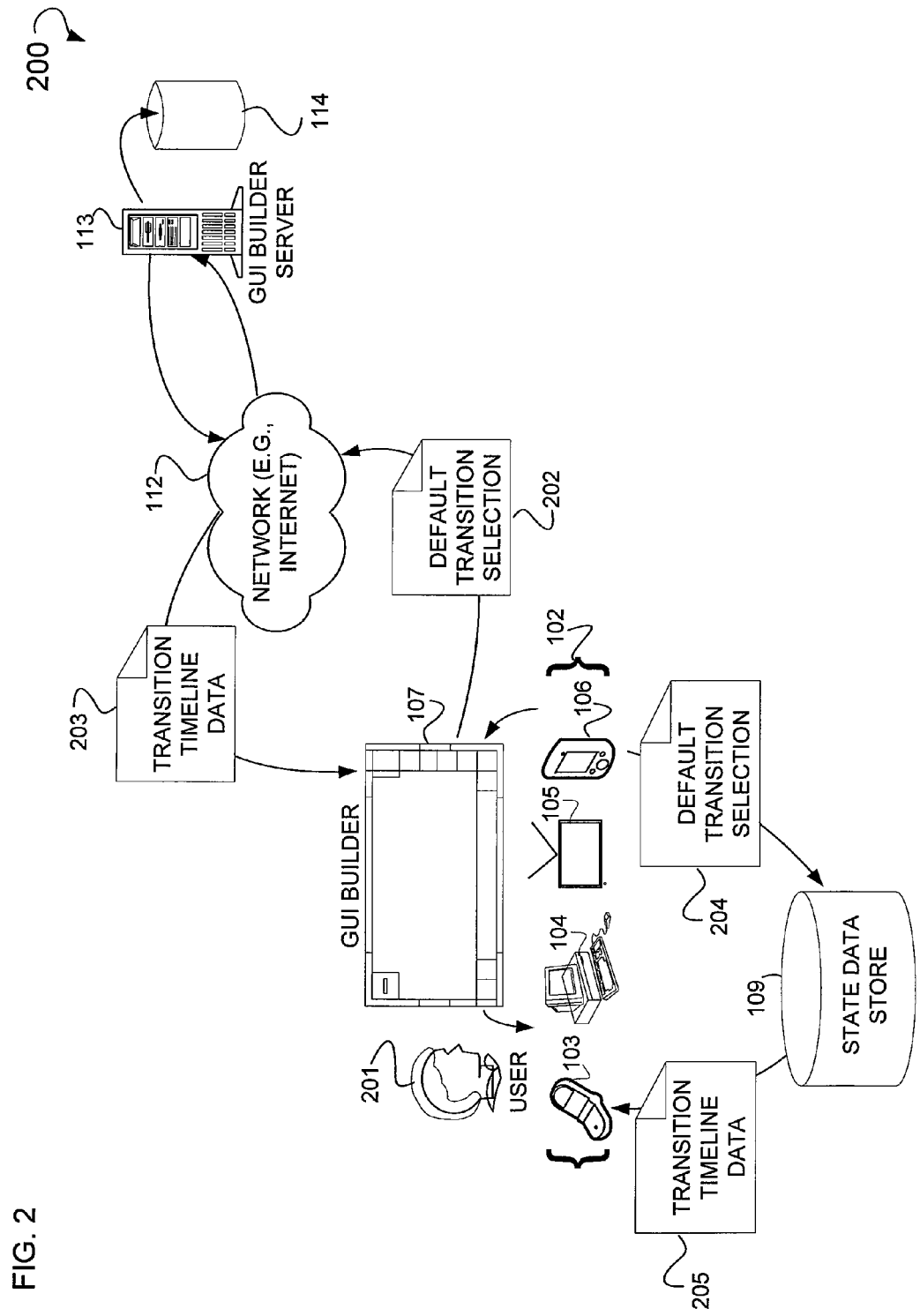
FIG. 2 is a diagram of a system, according to an example embodiment, used to generate a default transition selection and to receive transition timeline data.

FIG. 2 is a diagram of an example system 200 used to generate a default transition selection and to receive transition timeline data. Shown is a user 201 utilizing one of the devices 102 to generate a default transition selection 202. This default transition selection 202 may be generated through the use of the previously referenced GUI builder 107. In some example embodiments, the default transition selection 202 is transmitted across the network 112 and received by the GUI builder server 113. The default transition selection 202 is formatted using XML, MXML, ActionScript, or some other suitable language. This GUI builder server 113 may retrieve transition timeline data 203 from the database 114, and/or may process the default transition selection 202 to generate the transition timeline data 203. The transition timeline data 203 is formatted using XML, MXML, HTML, ActionScript, or some other suitable language. This transition timeline data 203 is transmitted by the GUI builder server 113 across the network 112 to be received by one of the devices 102. One of the devices 102 may process and display the transition timeline data 203 within the GUI builder 107.

In some example embodiments, a default transition selection 204 is generated by one of the devices 102 and transmitted or otherwise provided to the database 109. The default transition selection 204 may be formatted as SQL. The transition timeline data 205 is retrieved from the database 109 by one of the devices 102 for display within the GUI builder 107. The transition timeline data 205 is formatted as XML, MXML, HTML, ActionScript, or some other suitable language. The methods and operations associated with the generation of the default transition selection 202 and 204 and the transition timeline data 203 and 205 will be more fully illustrated below.

Example Interface

Figure 3:
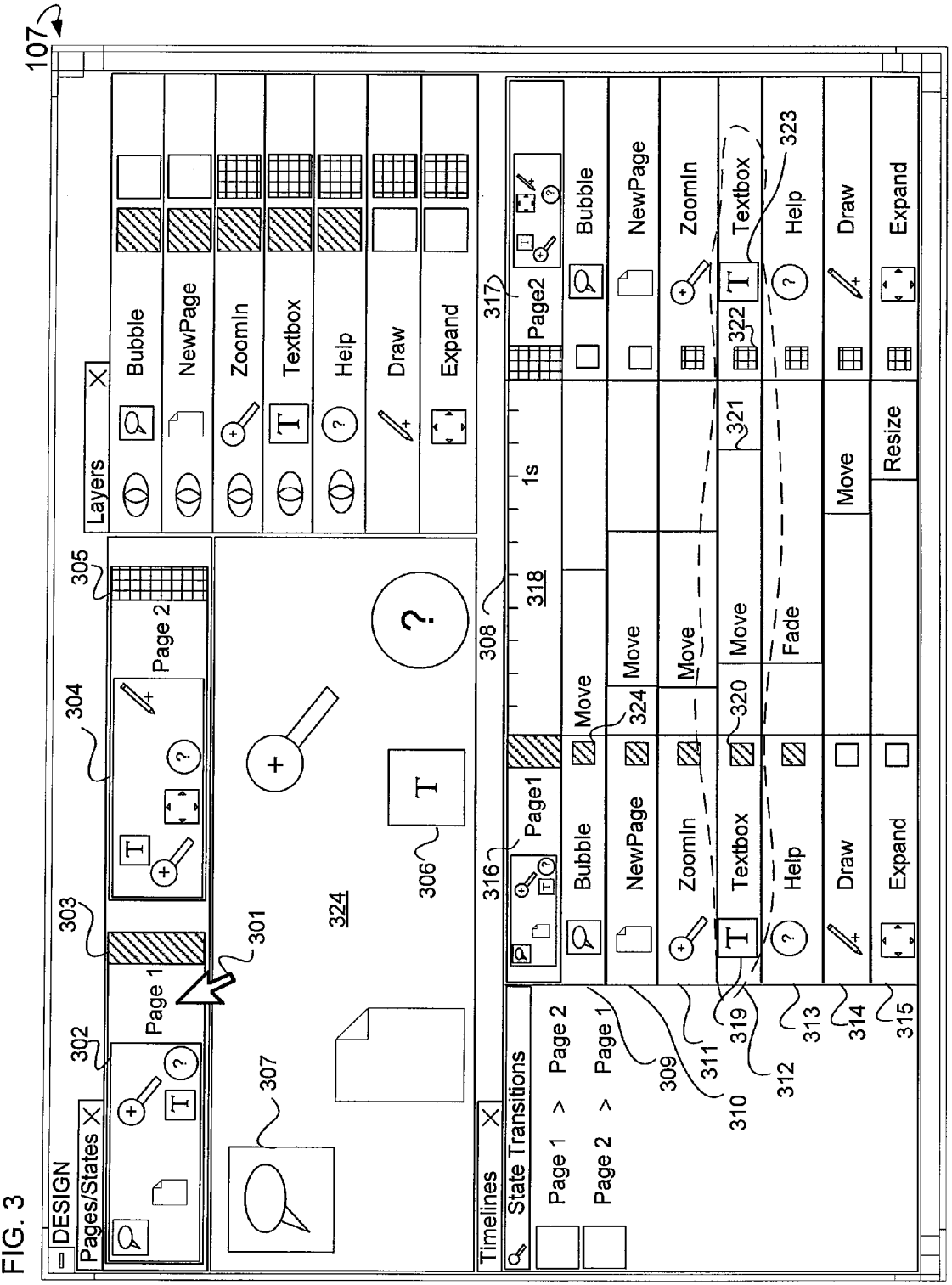
FIG. 3 is a diagram of a GUI builder, according to an example embodiment, to display transition timeline data.

FIG. 3 is a diagram of an example GUI builder 107 displaying transition timeline data. Shown is a graphical pointer 301 that selects a state icon 302. Associated with this state icon 302 is a state reference icon 303. This state reference icon 303 may represent a state via a unique color, pattern, icon shape or some other visual mechanism to represent a particular state. Further, the state icon 302 may also display objects associated with a particular state. Also shown, is a state icon 304, and an associated state reference icon 305. State icon 302 corresponds to a state in the form of page 1, whereas state icon 304 corresponds to a state in the form of page 2. Illustrated is a display area 324 that displays objects associated with page 1. In some embodiments, these objects are arranged within the display area 324 to represent these objects as they would be displayed at runtime (e.g., when the page 1 or page 2 would be executed as part of a software application). Objects displayed within display area 324 include an object 306 titled "Textbox" and an object 307 titled "Bubble." Further, shown as a part of the GUI builder 107 is a selection mechanism in the form of a transition timeline display area 308. This transition timeline display area 308 includes a number of parts. For example, as part of this transition timeline display area 308, a state column 316 is shown and a state column 317 is shown. With respect to the state column 316, objects associated with page 1 are displayed within this column. With respect to the state column 317, objects associated with page 2 are displayed within this column. Further, included as entries within the transition timeline display area 308 are various tracks 309 through 315 displayed collectively as a track list. Each track includes a selection object and a corresponding start target and end target. For example, track 312 includes a start target 319 that corresponds to the object 306. Track 312 also includes an end target 323 that again corresponds to the object 306. Selection object 320 includes a state reference icon 303 denoting that the object 306 is associated with page 1 represented at state icon 302. Further, selection objection 322 includes a state reference icon 305 showing that object 306 is also associated with page 2 represented at state icon 304. Additionally, included within the track 312 is a visual effects bar 321 denoting a time of execution for a particular visual effect in the form of a transition. In some example embodiments, a plurality of visual effects bars are included within a track. The actual time of execution is denoted by the timeline 318 appearing at the top of the transition timeline display area 308. This timeline 318 may be divided into intervals of second, milliseconds, or some other suitable measure of time during which an object may transition form one state to another state via a visual effect.

Figure 4:
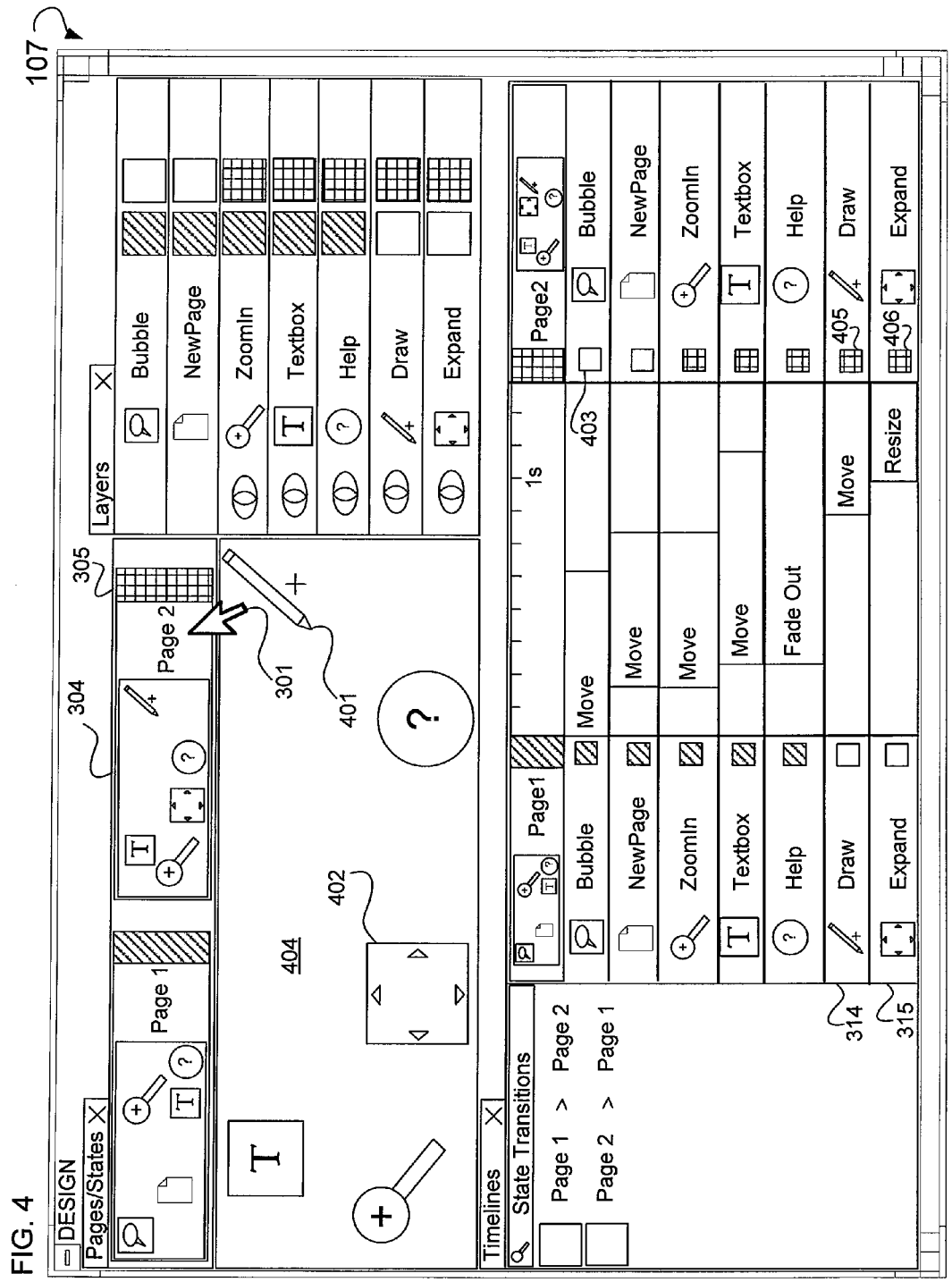
FIG. 4 is a diagram of a GUI builder, according to an example embodiment, illustrating transition timeline data associated with a state.

FIG. 4 is a diagram of an example GUI builder 107 illustrating transition timeline data associated with a state. Shown is graphical pointer 301 that is used to select the state icon 304. An object 401 and object 402 are displayed in a display area 404. Both of the objects 401 and 402 are associated with page 2 represented by state icon 304. In some embodiments, these objects 401 and 402 are arranged within the display area 404 to represent these objects as they would be displayed at runtime (e.g., when the page 2 would be executed as part of a software application). Further, a default selection object 403 is illustrated. This default selection object 403 represents an object that is not associated with a state. In some example embodiments, this default selection object 403 may be grayed out, or use some other visual indication that the object is not associated with a state. Also shown, is a selection object 405 illustrating the association between the object 401 and page 2 represented by state icon 304. Further, shown is a selection object 406 illustrating the association of the object 402 with page 2 represented by state icon 304.

Figure 5:
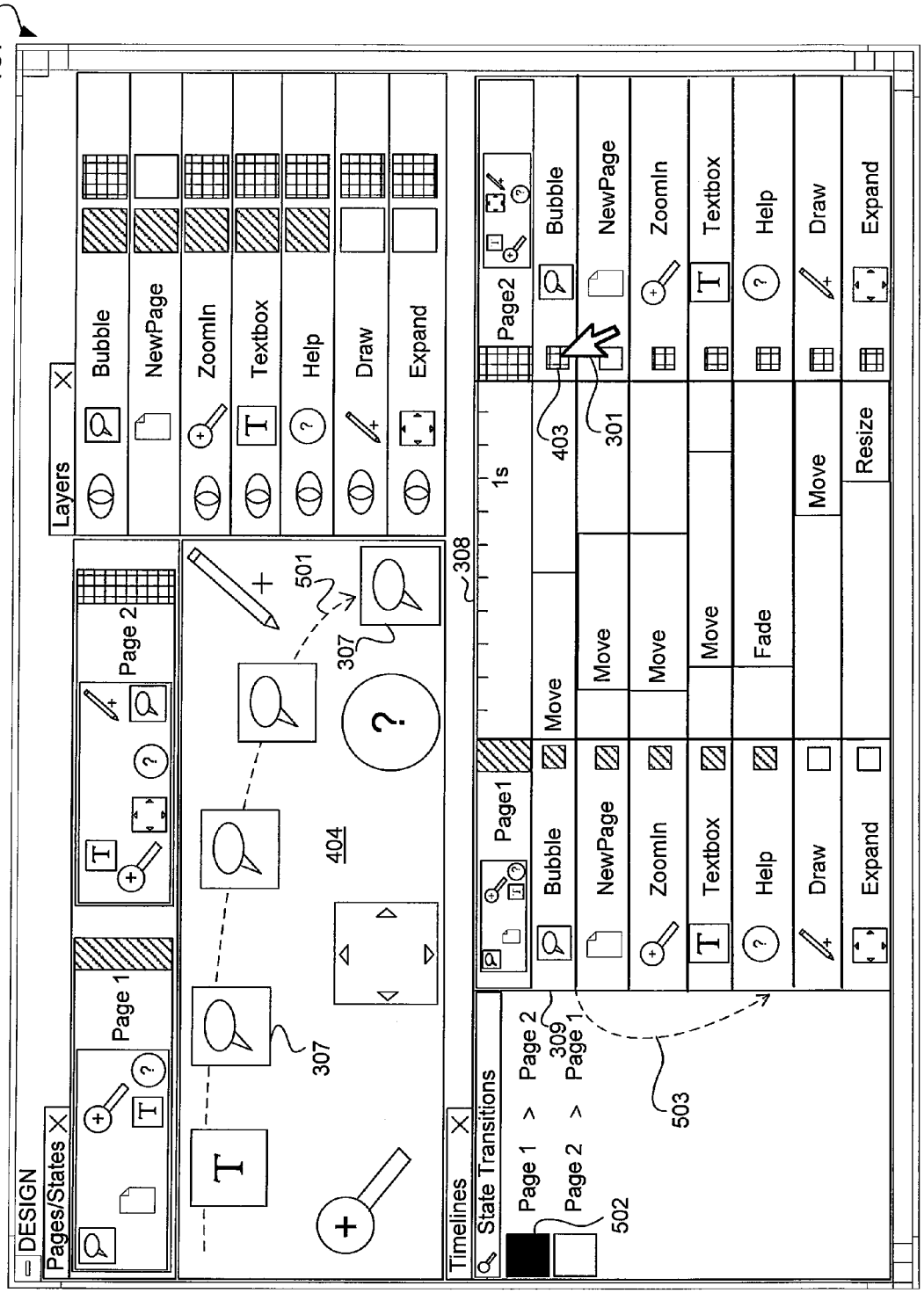
FIG. 5 is a diagram illustrating a GUI builder, according to an example embodiment, illustrating the execution of a selection object, and the subsequent re-sorting of the transition timeline display area and tracks associated therewith.

FIG. 5 is a diagram illustrating an example GUI builder 107 illustrating the execution of a selection object, and the subsequent re-sorting of the transition timeline display area 308 and the tracks 309 through 315 associated therewith. Shown is the graphical pointer 301 that is used to select the default selection object 403. Through the selection of the default selection object 403, the object 307 that was previously only associated with page 1 is now associated with page 2 (e.g., each represented by state icons 302 and 304 shown in FIG. 3 respectively). Through the execution of the default selection object 403, the default selection object 403 becomes associated with the state reference icon 305 shown in FIG. 3 (e.g., taking on the unique color, pattern, icon shape or some other visual mechanism to represent the state reference icon 305). Further, a visual effect becomes associated with the object 307 such that when a transition occurs between page 1 and page 2 the object 307 moves according to the transition associated with this object 307. This transition is illustrated at 501 and is represented via the visual effect of move. Other transitions with visual effects may be implemented, which may include, as previously referenced, fade in, fade out, resize or some other suitable visual effect associated with a transition.

In cases where a default selection object is executed and associated with a state reference icon, the order of the tracks within the track list may be re-sorted. Here, for example, the track 309 shown in FIG. 3 is moved from being a first entry in the track list to being an entry associated with other entries having characteristics similar to track 309. This movement is illustrated at 503. These other entries have characteristics that include an object that is selected for both states (e.g., referenced as state icons 302 and 304 at page 1 and page 2) and appearing within the transition timeline display area 308. In some example embodiments, a state transition object 502 is selected to display the transition 501 at design time or run time within the display area 404. As will be more fully illustrated below, the actual sorting or re-sorting order for the various tracks within the track list is based upon certain preset values dictated by, for example, the user 101, shown in FIG. 1. Here, for example, tracks denoting the association of an object with only page 1 are shown first. Tracks denoting the association of an object with both page 1 and page 2 are shown second. Tracks illustrating the association of objects with page 2 are illustrated third. The term "illustrated" denotes a listed order within the transition timeline display area 308.

Figure 6:
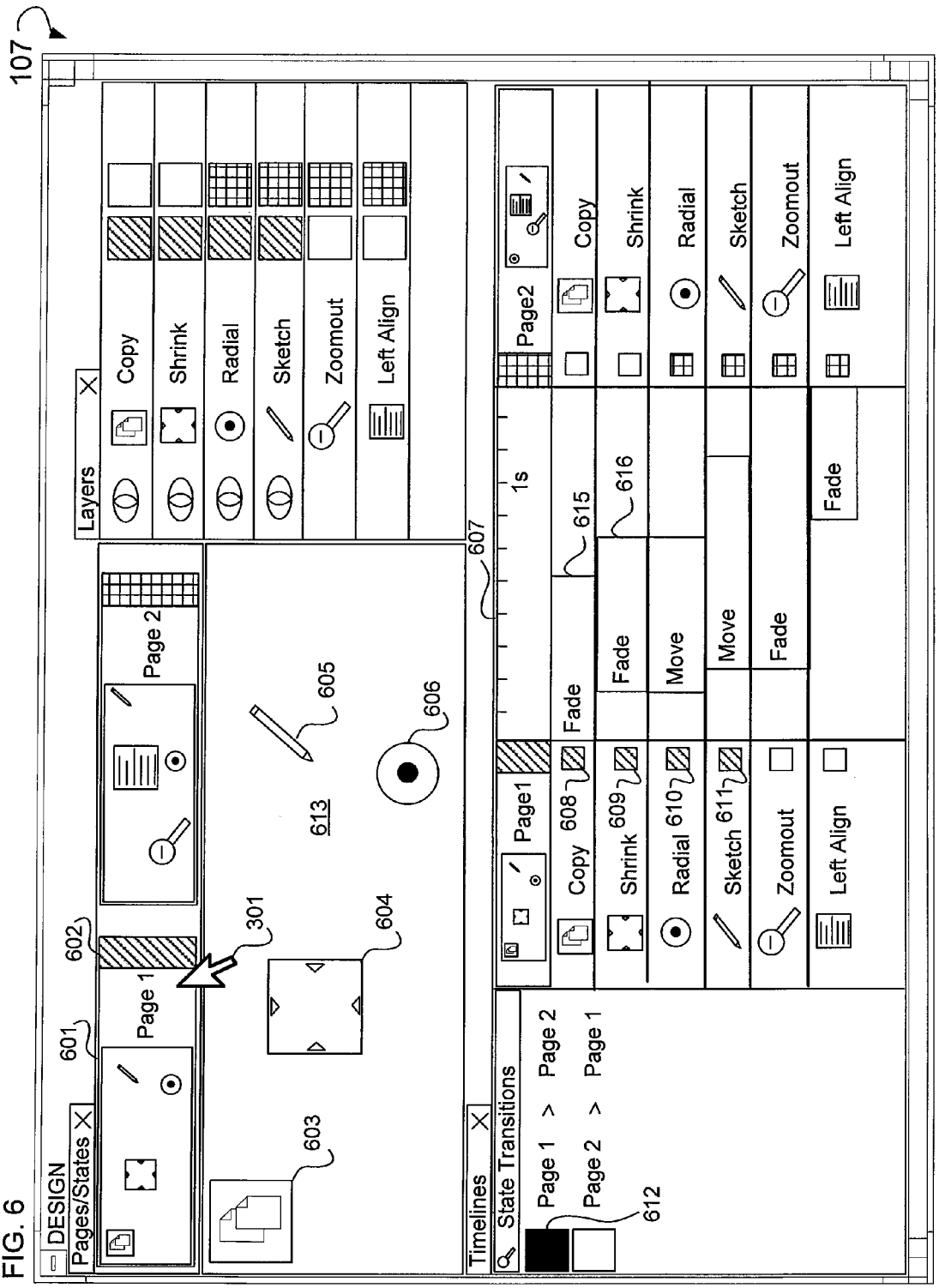
FIG. 6 is a diagram illustrating a GUI builder, according to an example embodiment, showing transition timeline data generated through a default transition selection.

FIG. 6 is a diagram illustrating an example GUI builder 107 showing transition timeline data generated through a default transition selection. Shown is the graphical pointer 301 is used to select the state icon 601. Objects 603 through 606 are associated with a page 1 that corresponds to a state icon 601. These objects 603 through 606 appear within the display area 613 at run time or design time. Further, a transition timeline display area 607 is shown that includes a track list with a number of tracks. Associated with each track is a selection object that is executed to associate the aforementioned objects (e.g., objects 603 through 606) with page 1. Here, for example, selection object 608 is executed to associate the object 603 with page 1. Further, as shown by the visual effects bar 615, the object 603 is to fade from view (e.g., fade out) upon a transition to another state. Selection object 609 is executed to associate the object 604 with page 1. Additionally, as shown by the visual effects bar 616, the object 604 is to fade from view (e.g., fade out) upon a transition to another state. Selection object 610 is executed to associate the object 606 with page 1 and the selection object 611 is executed to associate the object 605 with page 1. Further, a state transition object 612 is executed to denote a transition at runtime, or in some cases design time, between page 1 and page 2.

Figure 7:
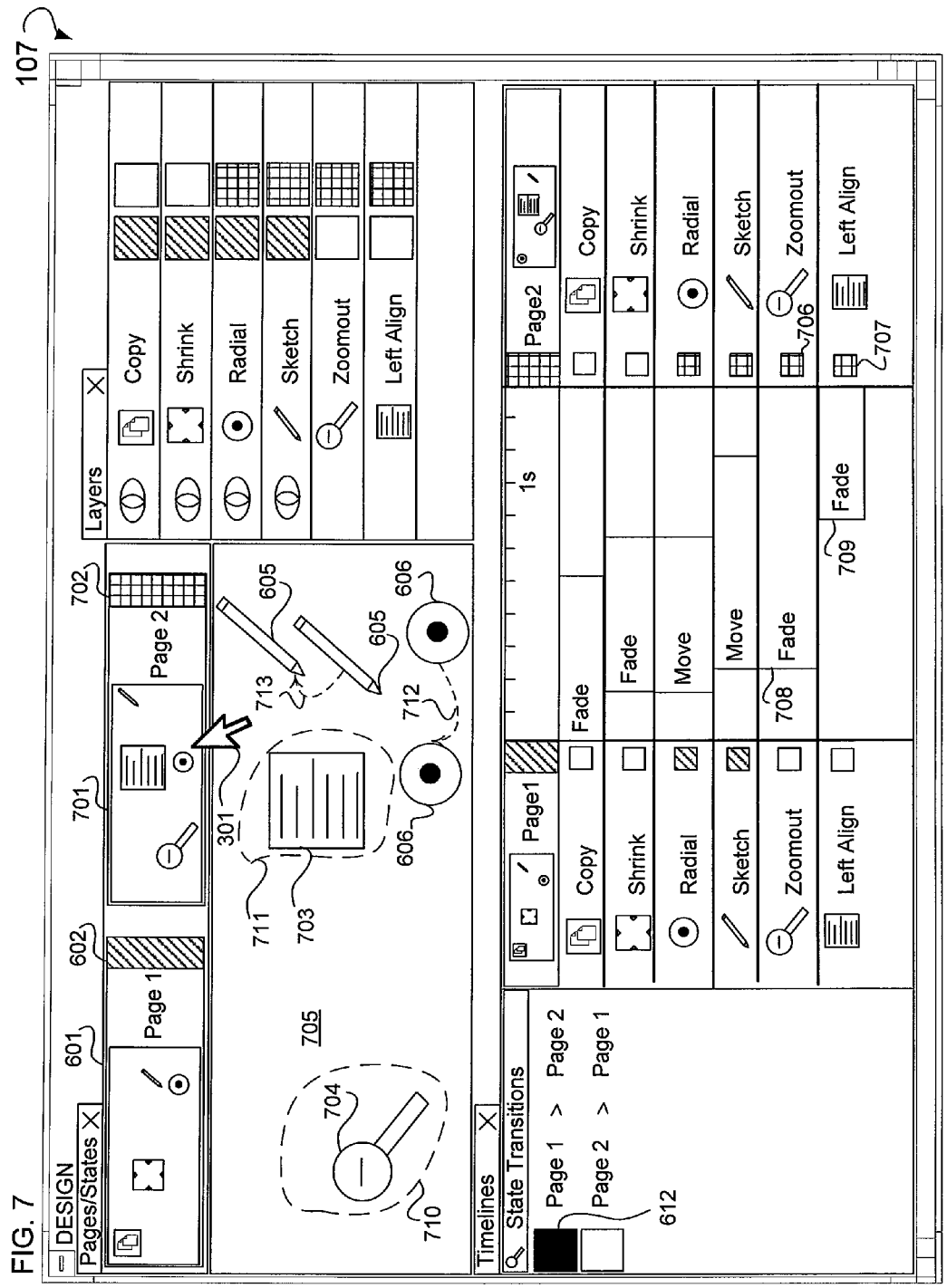
FIG. 7 is a diagram illustrating a GUI builder, according to an example embodiment, showing the display of a default transition selection.

FIG. 7 is a diagram illustrating an example GUI builder 107 showing the display of a default transition selection. Shown is a graphical pointer 301 that is used to select a state icon 701. The state icon 701 also has a state reference icon 702. Also shown, are objects 703 and 704 that appear at design time or run time within a display area 705 associated with a state in the form of page 2. At design time or runtime, when the state transition object 612 is executed, the selection objects 706 and 707 may be automatically selected by default so as to allow a transition between a start state and an end state. The selection objects 706 and 707 correspond to objects 704 and 703 respectively. "Automatically selected" as used herein includes the execution of a script by a computer system, wherein the script dictates visual effects to be associated with an object that is associated with a state. A script may include instructions written in ActionScript, JavaScript, XML, MXML, or some other suitable scripting language. Further, these visual effects facilitate a transition of objects between a start state (e.g., page 1 represented by state icon 601) and an end state (e.g., page 2 represented by state icon 701). For example, a visual effect in the form of a move 712 illustrates the movement of the object 606 to an ending position within the display area 705. Additionally, a visual effect in the form of a move 713 is illustrated with respect to object 605. A visual effect in the form of a fade-in 711 is illustrated for the ending position of the object 703 within the display area 705. Similarly, a visual effect in the form of a fade-in 710 is illustrated for the ending position of the object 704 within the display area 705. The fade-in 710 and fade-in 711 are automatically generated by default through using the methods outlined below.

Example Logic

Figure 8:
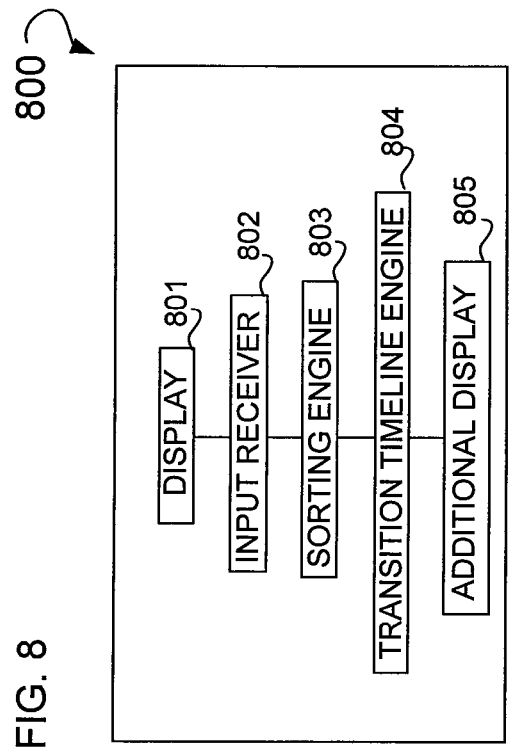
FIG. 8 is a block diagram of a computer system, according to an example embodiment, used to generate a transition selection and receive transition timeline data.

FIG. 8 is a block diagram of an example computer system 800 used to generate a transition selection and receive transition timeline data. The blocks shown herein may be implemented in software, firmware, or hardware. These blocks may be directly or indirectly communicatively coupled via a physical or logical connection. The computer system 800 may be the one or more devices 102 shown in FIGS. 1-2. Shown are blocks 801 through 805. Illustrated is a display 801 to display a first visual representation of a set of object properties of a plurality of objects, and a second visual representation of a set of object properties of the plurality of objects, each object of the plurality of objects having a property. Communicatively coupled to the display 801 is an input receiver 802 (e.g., an input device) to receive input selecting an object of the plurality of objects having the property, the property displayed as a transition of the selected object from the first visual representation to the second visual representation. Communicatively coupled to the input receiver 802 is a sorting engine 803 to sort the plurality of objects based upon the selected object to create a sorted plurality of objects. Communicatively coupled to the sorting engine 803 is a transition timeline engine 804 to generate transition timeline data that includes the sorted plurality of objects. In some example embodiments, each object of the plurality of objects comprises at least one of a component, a widget, user interface control, a layer, a group, a graphic artwork, text, or a path. In some example embodiments, the transition timeline data includes at least one track providing a representation of a transition of an object from the first visual representation of the set of object properties to the second visual representation of the set of object properties. Further, in some example embodiments, the track includes at least one of an effect bar, a start target, or an end target. In some example embodiments, the property includes at least one of a move effect, a wipe effect, a resize effect, a fade-in effect, an auditory effect, or a fade-out effect. Communicatively coupled to the transition timeline engine 804 is an additional display 805 to display the transition timeline data as part of a transition timeline display area, the transition timeline display area including at least one of the first visual representation, the second visual representation, the plurality of objects, or the property. In some example embodiments, the transition of the selected object from the first visual representation to the second visual representation is represented as occurring over time. In some example embodiments, the transition of the selected object from the first visual representation to the second visual representation is represented as occurring at a completion of an event.

Figure 9:
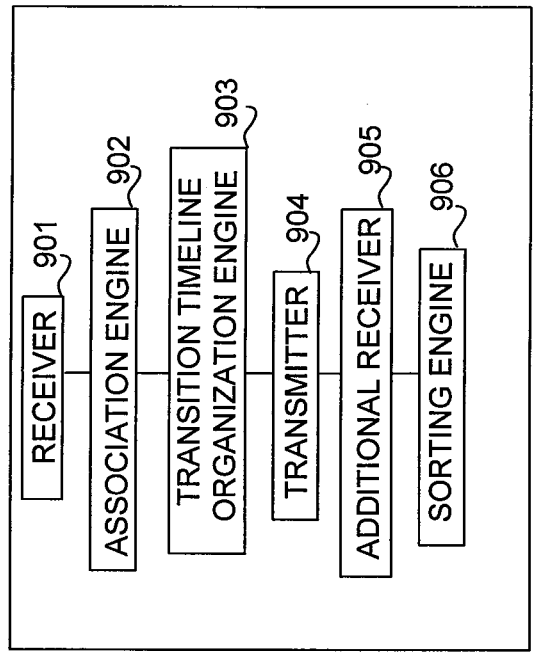
FIG. 9 is a block diagram of a computer system, according to an example embodiment, used to receive a transition selection and to transmit transition timeline data.

FIG. 9 is a block diagram of an example computer system 900 used to receive a transition selection and to transmit transition timeline data. The blocks shown herein may be implemented in software, firmware, or hardware. These blocks may be directly or indirectly communicatively coupled via a physical or logical connection. The computer system 900 may be the GUI builder server 113 shown in FIGS. 1-2. Shown are blocks 901 through 906. Illustrated is a receiver 901 to receive a transition selection identifying a plurality of objects and an associated property for each object of the plurality of objects. An association engine 902 is communicatively coupled to the receiver 901, the association engine 902 to associate at least one set of object properties with each object of the plurality of objects. Communicatively coupled to the association engine 902 is a transition timeline organization engine 903 to organize the plurality of objects into transition timeline data. Communicatively coupled to the transition timeline organization engine 903 is a transmitter 904 to transmit the transition timeline data. In some example embodiments, the property is represented within the transition timeline data as a transition. In some example embodiments, the organizing includes sorting each object of the plurality of objects into a sorting order based upon the association with the at least one set of object properties. Communicatively coupled to the transmitter 904 is an additional receiver 905 to receive an additional transition selection identifying an association of the property with each object of an additional plurality of objects. Communicatively coupled to the additional receiver 905 is a sorting engine 906 to sort each object of the additional plurality of objects based upon the additional transition selection.

Figure 10:
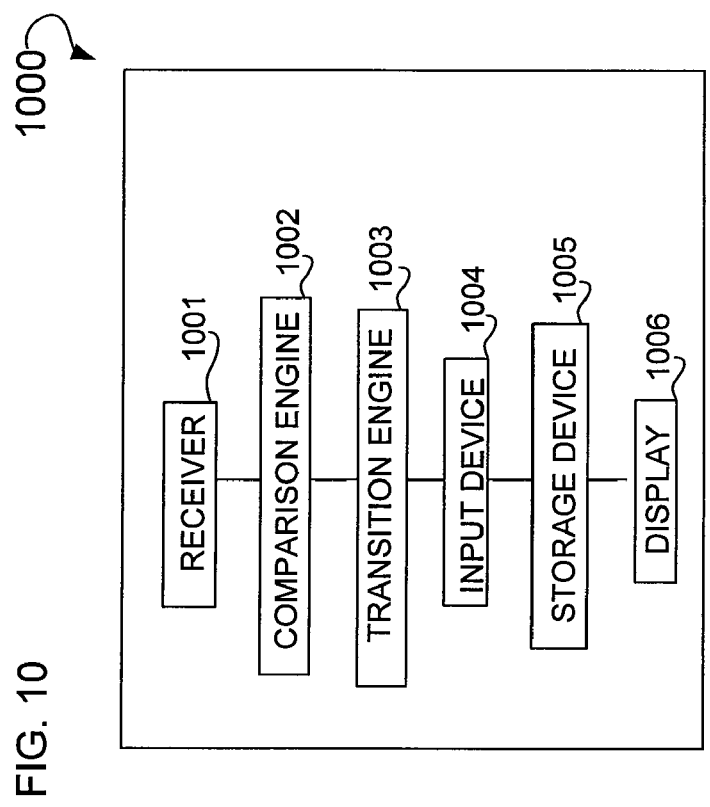
FIG. 10 is a block diagram of a computer system, according to an example embodiment, used to generate a default transition selection and the receive transition timeline data.

FIG. 10 is a block diagram of an example computer system 1000 used to generate a default transition selection and the receive transition timeline data. The blocks shown herein may be implemented in software, firmware, or hardware. These blocks may be directly or indirectly communicatively coupled via a physical or logical connection. The computer system 800 shown in FIG. 8 may be the one or more devices 102 shown in FIGS. 1-2. Shown are blocks 1001 through 1007. Illustrated is a receiver 1001 to receive at least two states, each state including at least one object with an associated property. Communicatively coupled to the receiver 1001 is a comparison engine 1002 to compare each object of each state to produce a set of differences between states. Communicatively coupled to the comparison engine 1002 is a transition engine 1003 to define a transition based upon the set of differences. In some example embodiments, a state is a set of object properties. In some example embodiments, the at least one object includes at least one of a component, a widget, user interface control, a layer, a group, a graphic artwork, text, or a path. In some example embodiments, the property includes at least one of a move effect, a wipe effect, a resize effect, a fade-in effect, an auditory effect, or a fade-out effect. In some example embodiments, the set of differences includes the transition as a default transition that identifies properties that are automatically selected, based upon a difference in objects shared between the at least two states, in lieu of being user selected. Communicatively coupled to the transition engine 1003 is an input device 1004 to receive object selection input identifying an additional object with an additional property associated with one of the at least two states. In some example embodiments, the comparison engine 1002 is used to compare each object of each state to produce an additional set of differences between states. In some example embodiments, the transition engine 1003 is used to define an additional transition based upon the additional set of differences between states. Communicatively coupled to the input device 1004 is a storage device 1005 to store the transition. Communicatively coupled to the storage device 1005 is a display 1006 to display the transition within a display area.

Figure 11:
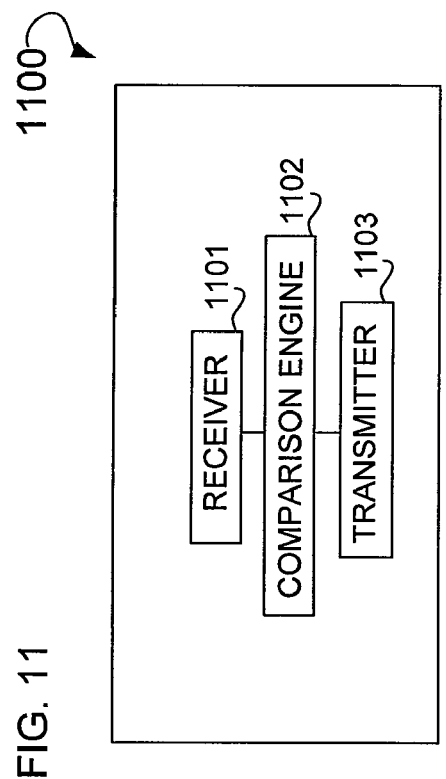
FIG. 11 is a block diagram of a computer system, according to an example embodiment, used to generate a default transition selection and to transmit transition timeline data.

FIG. 11 is a block diagram of an example computer system 1100 used to generate a default transition selection and to transmit transition timeline data. The blocks shown herein may be implemented in software, firmware, or hardware. These blocks may be directly or indirectly communicatively coupled via a physical or logical connection. The computer system 800 shown in FIG. 8 may be the one or more devices 102 shown in FIGS. 1-2. Shown are blocks 1101 through 1103. Illustrated is a receiver 1101 to receive a default transition selection identifying a first state and a second state, each of the first state and the second state including at least one object with an associated property. Communicatively coupled to the receiver 1101 is a comparison engine 1102 to compare each object of the first state and the second state to produce a set of differences between states. Communicatively coupled to the comparison engine 1102 is a transmitter 1103 to transmit transmission timeline data that includes the set of differences between states. In some example embodiments, the default transition selection includes a flag value identifying at least one of the first state, or the second state. In some example embodiments, the transition timeline data includes at least one track for the at least one object. In some example embodiments, the track includes at least one of an effect bar, a start target, or an end target.

Figure 12:
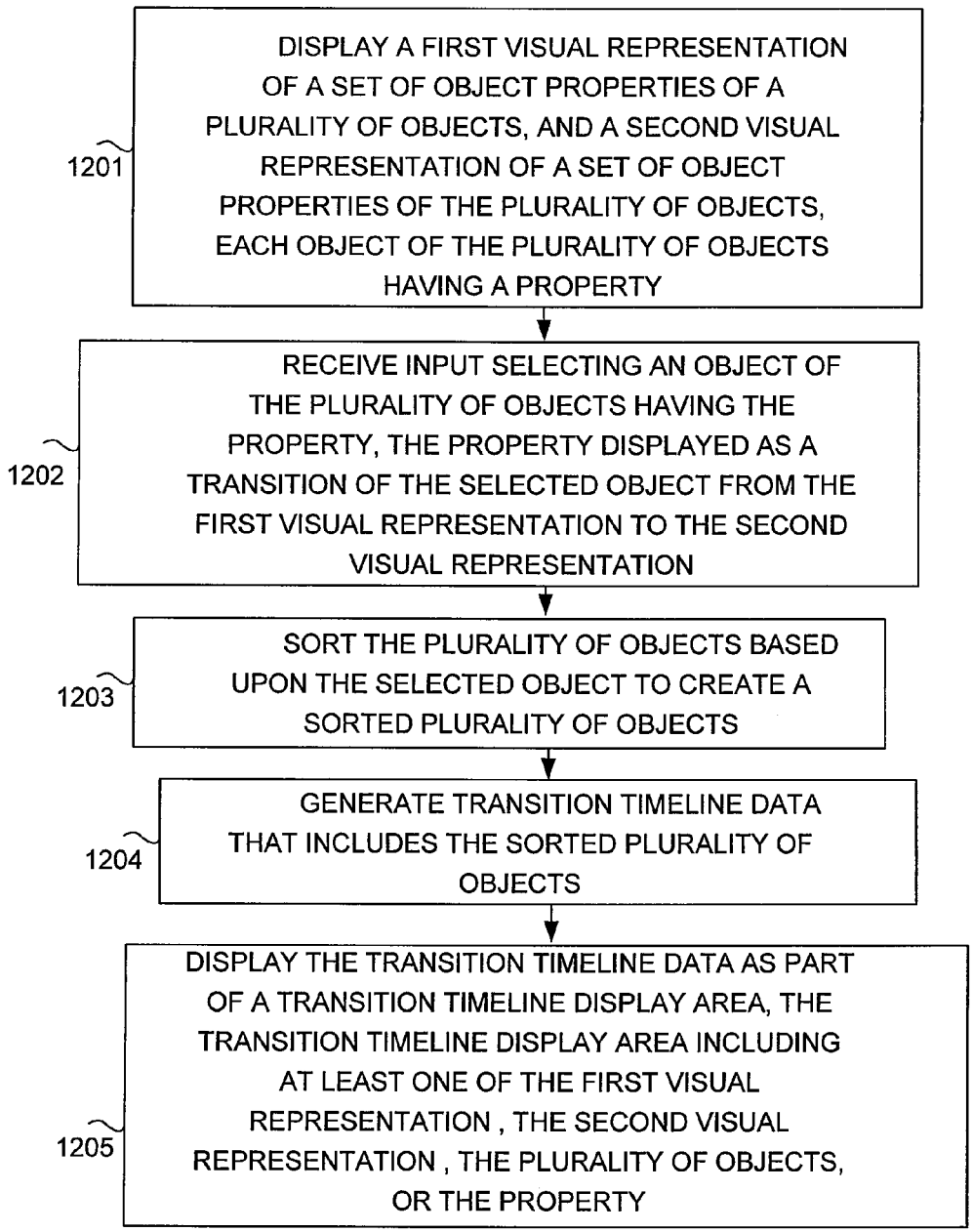
FIG. 12 is a flow chart illustrating a method, according to an example embodiment, used to generate a transition selection and receive transition timeline data.

FIG. 12 is a flow chart illustrating an example method 1200 used to generate a transition selection and receive transition timeline data. Shown are various operations 1201 through 1205 that may be executed on the one or more devices 102 shown in FIGS. 1-2. Shown is an operation 1201 that is executed by the display 801 to display a first visual representation of a set of object properties of a plurality of objects, and a second visual representation of a set of object properties of the plurality of objects, each object of the plurality of objects having a property. Operation 1202 is executed by the input receiver 802 to receive input selecting an object of the plurality of objects having the property, the property displayed as a transition of the selected object from the first visual representation to the second visual representation. Operation 1203 is executed by the sorting engine 803 to sort the plurality of objects based upon the selected object to create a sorted plurality of objects. Operation 1204 is executed by the transition timeline engine 804 to generate transition timeline data that includes the sorted plurality of objects. In some example embodiments, each object of the plurality of objects comprises at least one of a component, a widget, user interface control, a layer, a group, a graphic artwork, text, or a path. In some example embodiments, the transition timeline data includes at least one track providing a representation of a transition of an object from the first visual representation of the set of object properties to the second visual representation of the set of object properties. In some example embodiments, wherein the track includes at least one of an effect bar, a start target, or an end target. In some example embodiments, the property includes at least one of a move effect, a wipe effect, a resize effect, a fade-in effect, an auditory effect, or a fade-out effect. Operation 1205 is executed by the additional display 805 to display the transition timeline data as part of a transition timeline display area, the transition timeline display area including at least one of the first visual representation, the second visual representation, the plurality of objects, or the property. In some example embodiments, the display 801 and additional display 805 are the same display. In some example embodiments, the transition of the selected object from the first visual representation to the second visual representation is represented as occurring over time. In some example embodiments, the transition of the selected object from the first visual representation to the second visual representation is represented as occurring at a completion of an event.

Figure 13:
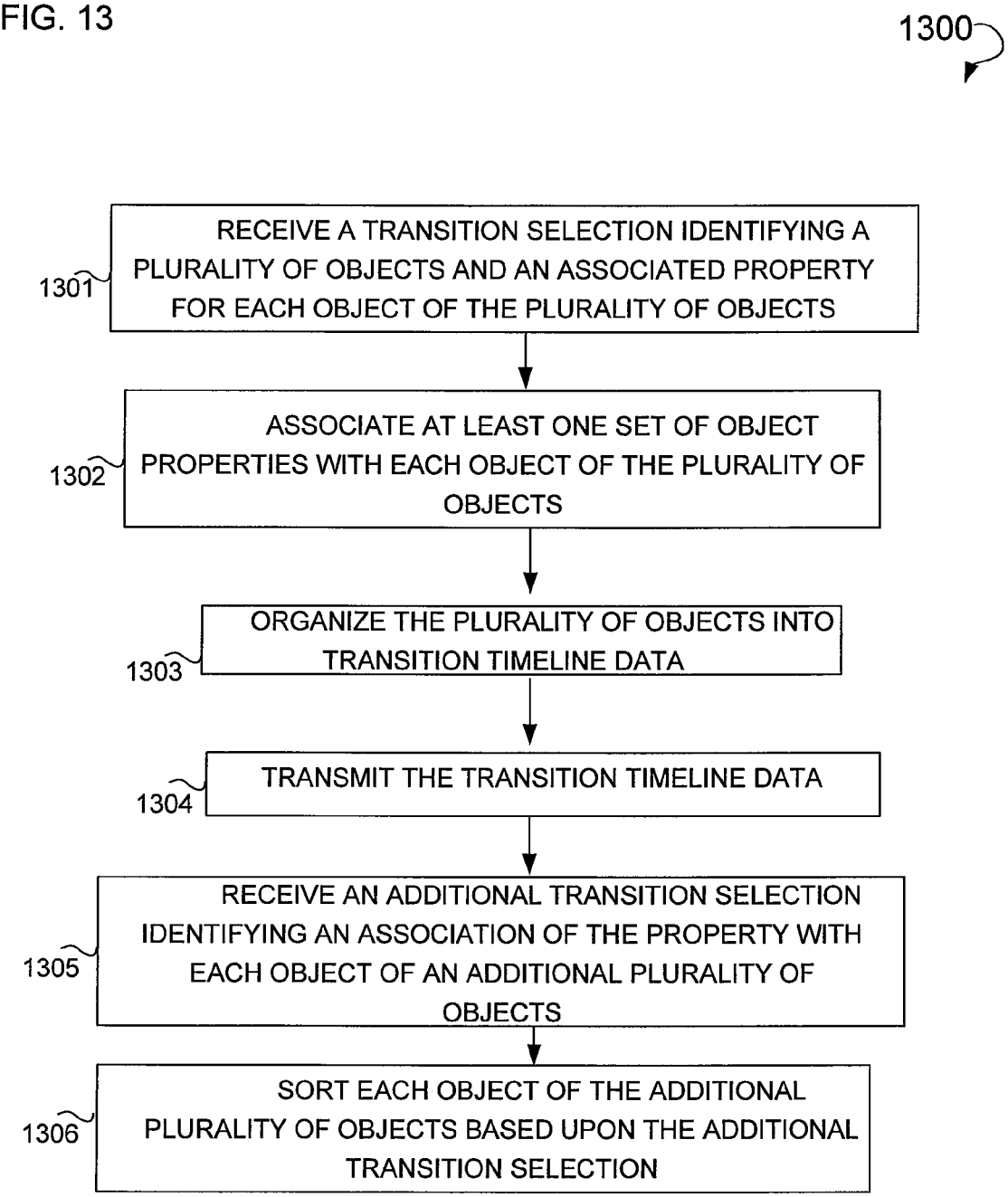
FIG. 13 is a flow chart illustrating a method, according to an example embodiment, used to receive a transition selection and to transmit transition timeline data.

FIG. 13 is a flow chart illustrating an example method 1300 used to receive a transition selection and to transmit transition timeline data. Shown are various operations 1301 through 1306 that may be executed on the one or more devices 102 shown in FIGS. 1-2. Shown is an operation 1301 is executed by the receiver 901 to receive a transition selection identifying a plurality of objects and an associated property for each object of the plurality of objects. Operation 1302 is executed by the association engine 902 to associate at least one set of object properties with each object of the plurality of objects. Operation 1303 is executed by the transition timeline organization engine 903 to organize the plurality of objects into transition timeline data. Operation 1304 is executed by the transmitter 904 to transmit the transition timeline data. In some example embodiments, the property is represented within the transition timeline data as a transition. In some example embodiments, the organizing includes sorting each object of the plurality of objects into a sorting order based upon the association with the at least one set of object properties. Operation 1305 is executed by the additional receiver 905 to receive an additional transition selection identifying an association of the property with each object of an additional plurality of objects. Operation 1306 is executed by the sorting engine 906 to sort each object of the additional plurality of objects based upon the additional transition selection.

Figure 14:
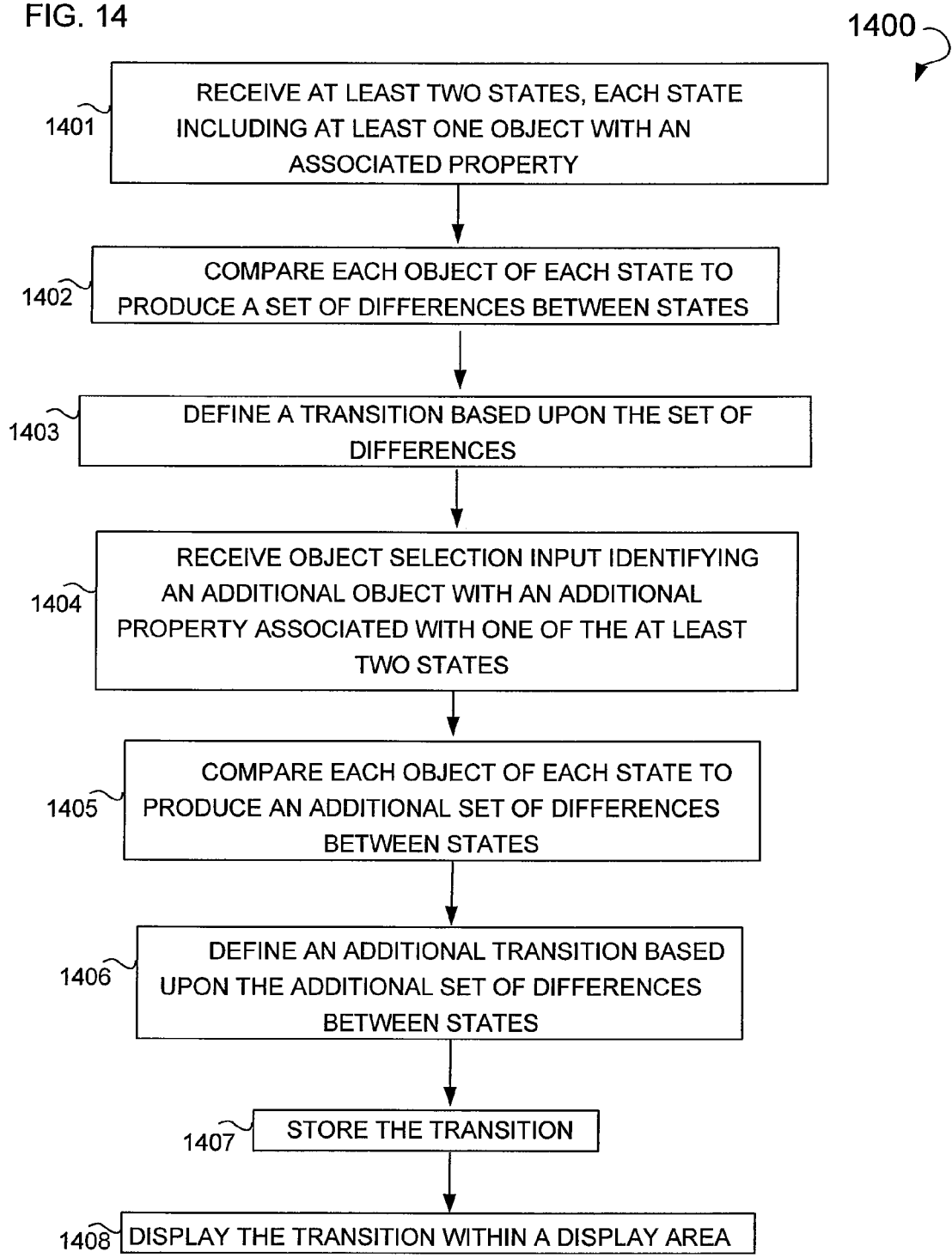
FIG. 14 is a flow chart illustrating a method, according to an example embodiment, used to generate a default transition selection and the receive transition timeline data.

FIG. 14 is a flow chart illustrating an example method 1400 used to generate a default transition selection and the receive transition timeline data. Shown are various operations 1401 through 1407 that may be executed on the one or more devices 102 shown in FIGS. 1-2. Shown is an operation 1401 is executed by the receiver 1001 to receive at least two states, each state including at least one object with an associated property. Operation 1402 is executed by the comparison engine 1002 to compare each object of each state to produce a set of differences between states. Operation 1403 is executed by the transition engine 1003 to define a transition based upon the set of differences. In some example embodiments, a state is a set of object properties. In some example embodiments, the at least one object includes at least one of a component, a widget, user interface control, a layer, a group, a graphic artwork, text, or a path. In some example embodiments, the property includes at least one of a move effect, a wipe effect, a resize effect, a fade-in effect, an auditory effect, or a fade-out effect. In some example embodiments, the set of differences includes the transition as a default transition that identifies properties that are automatically selected, based upon a difference in objects shared between the at least two states, in lieu of being user selected. Operation 1404 is executed by the input device 1004 to receive object selection input identifying an additional object with an additional property associated with one of the at least two states. The comparison engine 1002 may also be used to execute an operation 1405 to compare each object of each state to produce an additional set of differences between states. The transition engine 1003 may also be used to execute an operation 1406 to define an additional transition based upon the additional set of differences between states. Operation 1407 is executed by the storage device 1005 to store the transition. Operation 1408 is executed by the display 1006 to display the transition within a display area.

Figure 15:
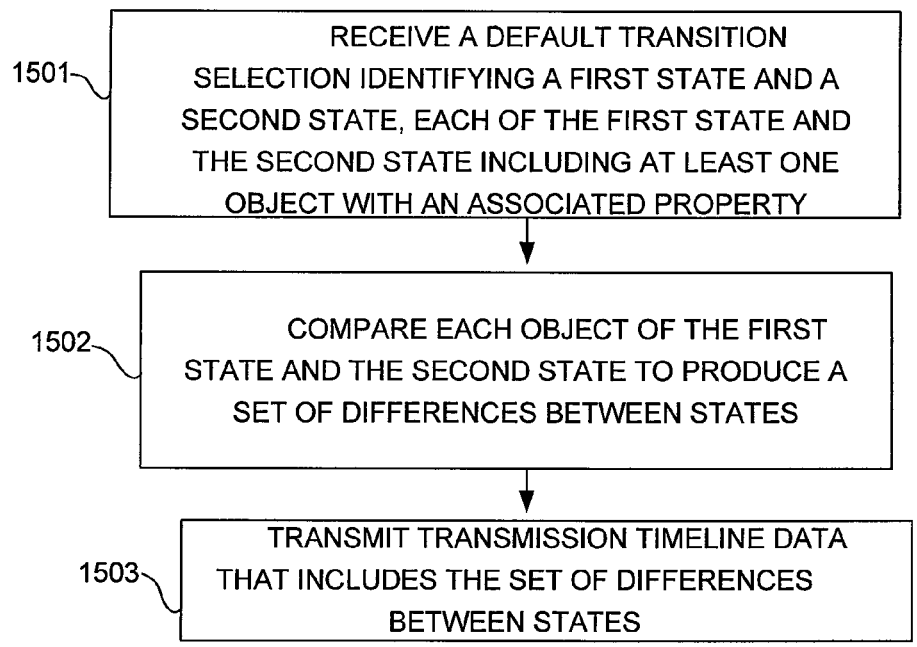
FIG. 15 is a flow chart illustrating a method, according to an example embodiment, used to generate a default transition selection and the receive transition timeline data.

FIG. 15 is a flow chart illustrating an example method 1500 used to generate a default transition selection and the receive transition timeline data. Shown are various operations 1501 through 1503 that may be executed by the GUI builder server 113 shown in FIGS. 1-2. Shown is an operation 1501 that is executed by the receiver 1101 shown in FIG. 1100 to receive a default transition selection identifying a first state and a second state, each of the first state and the second state including at least one object with an associated visual effect. Operation 1502 is executed by the comparison engine 1102 shown in FIG. 1100 to compare each object of the first state and the second state to produce a set of differences between objects. Operation 1503 is executed by the transmitter 1103 to transmit transmission timeline data that includes the set of differences between states. In some example embodiments, the default transition selection includes a flag value identifying at least one of the first state, or the second state. In some example embodiments, the transition timeline data includes at least one track for the at least one object. In some example embodiments, the track includes at least one of an effect bar, a start target, or an end target.

Figure 16:
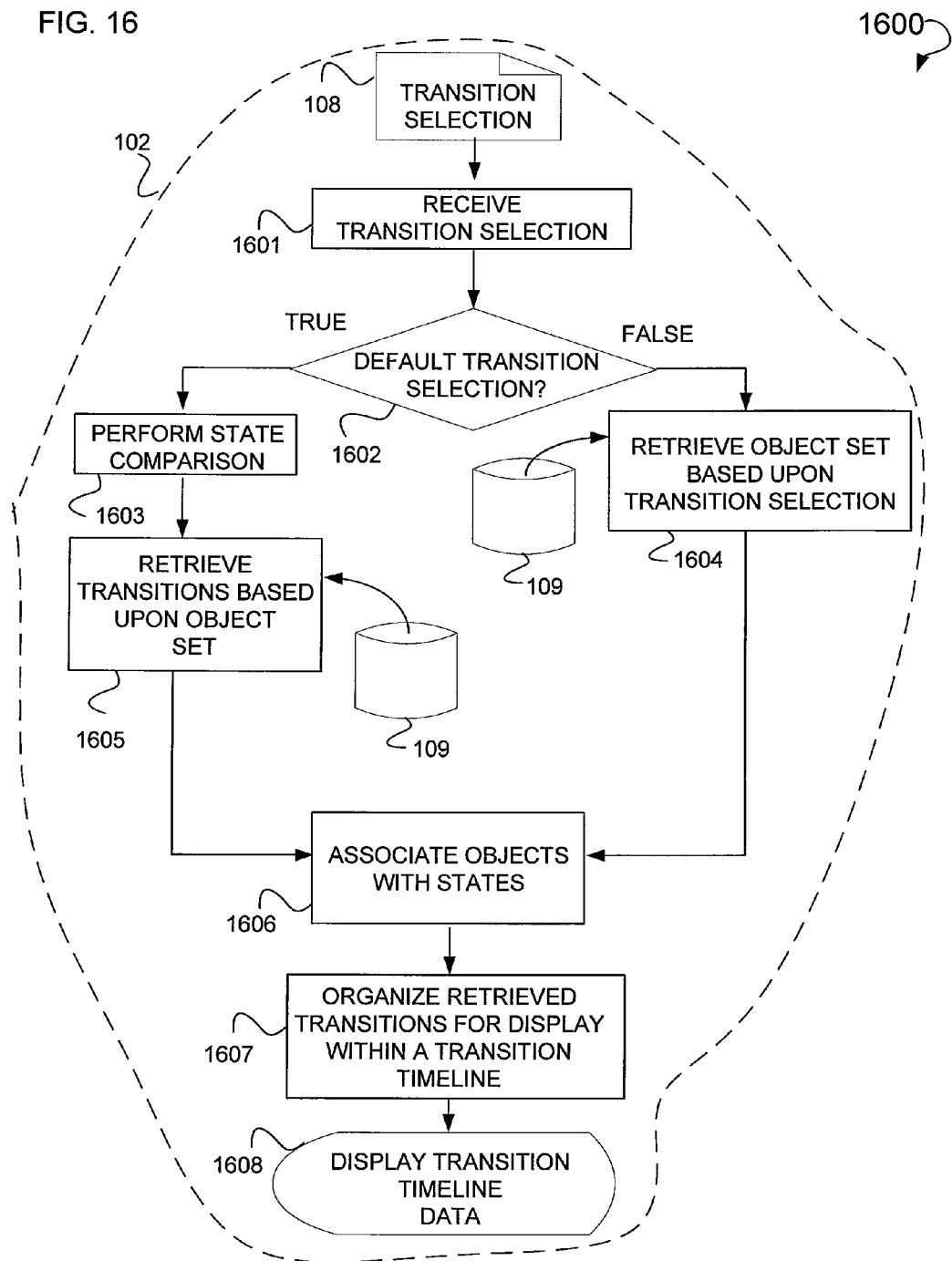
FIG. 16 is a flow chart illustrating the execution of a method, according to an example embodiment, used to display transition timeline data.

FIG. 16 is a flow chart illustrating the execution of a method 1600 used to display transition timeline data 110 shown in FIG. 1. Shown are various operations 1601 through 1608 that may be executed by one of the devices 102. An operation 1601 is executed to receive a transition selection in the form of transition selection 108. In some example embodiments, operation 1601 receives the default transition selection 204 shown in FIG. 2 in lieu of transition selection 108. A decisional operation 1602 is executed that determines whether a default transition selection has been received as a part of the transition selection 108. This default transition selection may be denoted by a particular flag value (e.g., a boolean value) or some other suitable value used to denote the existence of a default transition selection 204. In cases where decisional operation 1602 evaluates to "true" and operation 1603 is executed, in cases where decisional operation 1602 evaluates to "false" and operation 1604 is executed. Operation 1603, when executed, performs a state comparison between a state denoted by page 1, and a state denoted by page 2 to determine default transitions associated with objects of an end state. Operation 1604 is executed to retrieve an object set based upon a transition selection. The transition selection may be a set of visual effects specific to an object or objects. This object set may be objects associated with a particular state. (See e.g., objects 306 and 307 shown in FIG. 3 associated with page 1 or objects 401 and 402 shown in FIG. 4 associated with page 2). This object set is retrieved from, for example, the database 109. An operation 1605 is executed to retrieve transitions in the form of visual effects based upon an object set. This object set may include certain objects (e.g., objects 703 and 704 shown in FIG. 7) that are part of an end state. These transitions may be retrieved from the database 109. An operation 1606 is executed to associate objects with states, where this association does not previously exist. An operation 1607 is executed that organizes (e.g., sorts) retrieved transitions for display within the transition timeline. This transition timeline data is displayed as transition timeline data 110 through the execution of operation 1608. In some example embodiments, the transition timeline data is displayed as transition timeline data 205 shown in FIG. 2.

Figure 17:
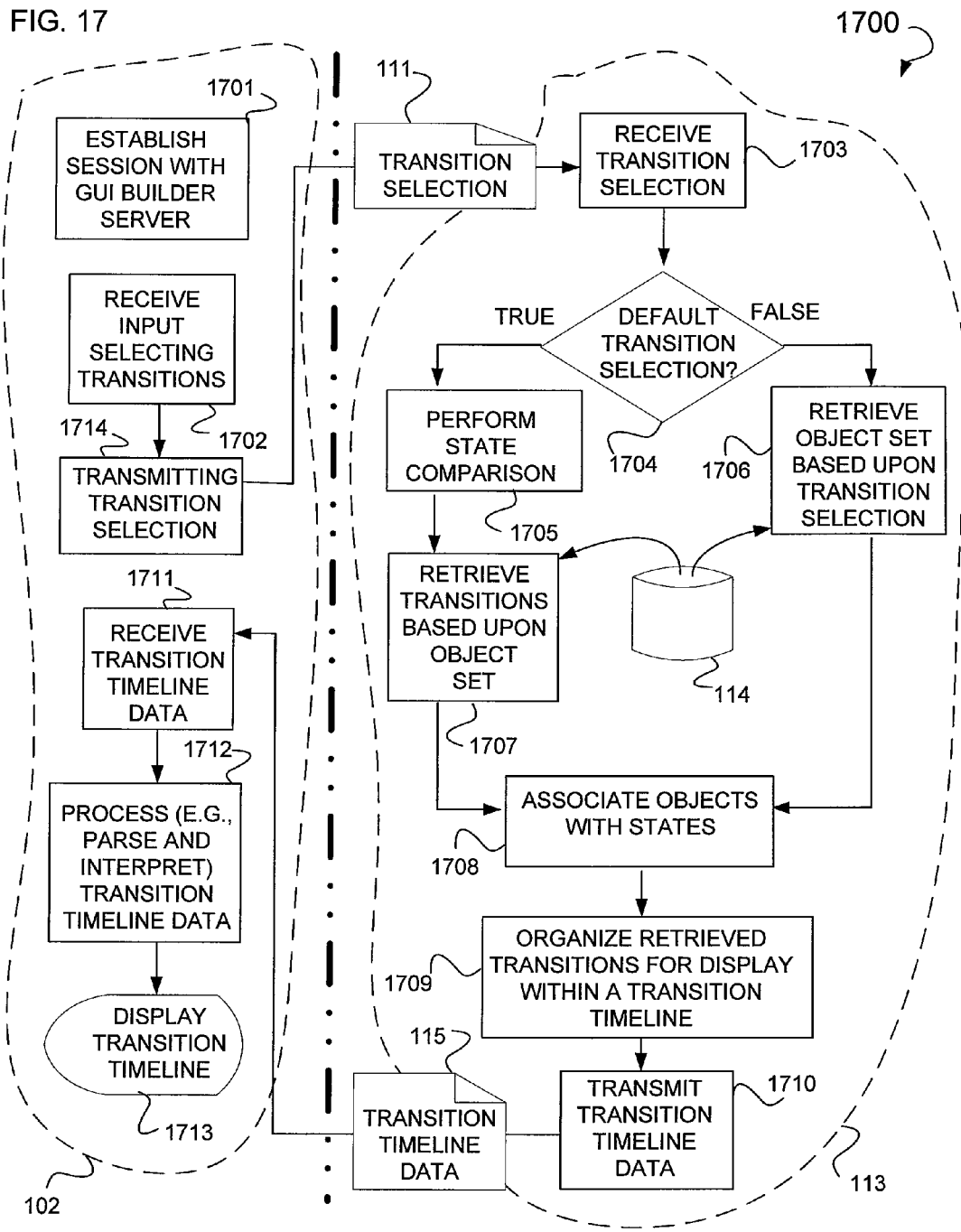
FIG. 17 is a dual-stream flow chart illustrating the execution of a method, according to an example embodiment, used to generate transition timeline data.

FIG. 17 is a dual-stream flow chart illustrating the execution of a method 1700 used to generate transition timeline data 115. Shown are various operations 1701 through 1702, and 1711 through 1714. These various operations may be executed by one of the devices 102. Further shown are operations 1703 through 1710 that may be executed by the GUI builder server 113. In some example embodiments, an operation 1701 is executed to establish a session between one of the devices 102 and the GUI builder server 113. This session may be a Transmission Control Protocol/Internet Protocol (TCP/IP) session, a login session, or some other suitable type session. An operation 1702 is executed that receives input that selects a transition. This input may be in the form of the execution of a selection object such as selection objects 405 or 406 shown in FIG. 4. An operation 1714 is executed that transmits the transition selection 111 to be received through the execution of operation 1703. In some example embodiments, operation 1714 transmits the default transition selection 202 shown in FIG. 2 in lieu of the transition selection 111. A decisional operation 1704 is executed that determines whether or not a default transition selection has been selected. In cases where decisional operation 1704 evaluates to "false," an operation 1706 is executed. In cases where a decisional operation 1704 evaluates to "true," an operation 1705 is executed. Operation 1706, when executed, retrieves an object from the database 114 based upon the received transition selection 111. Operation 1705 is executed to perform a state comparison between two states to determine which default transitions may be selected. An operation 1707 is executed to retrieve transitions based upon an object set that is defined through the execution of operation 1705. This object set may be associated with an end state (see e.g., state icon 701 shown in FIG. 7 and page 1). These transitions are retrieved from the database 114. An operation 1708 is executed that associates objects with states, where this association does not previously exist. An operation 1709 is executed that organizes the retrieved transitions for display within a transition timeline display area (see e.g., transition display area 308 shown in FIG. 3). This organization may take the form of sorting. Operation 1710 is executed to transmit the transition timeline as transition timeline data 115. In some example embodiments, transition timeline data 203 shown in FIG. 2 may be transmitted in lieu of transition timeline data 115. The transition timeline data 115 or 203 is received through the execution of operation 1711. Operation 1712 is executed that processes this transition timeline data 115 for display within the GUI builder 107 shown in FIGS. 1-7. Here, this GUI builder 107 is referenced at 1713.

Figure 18:
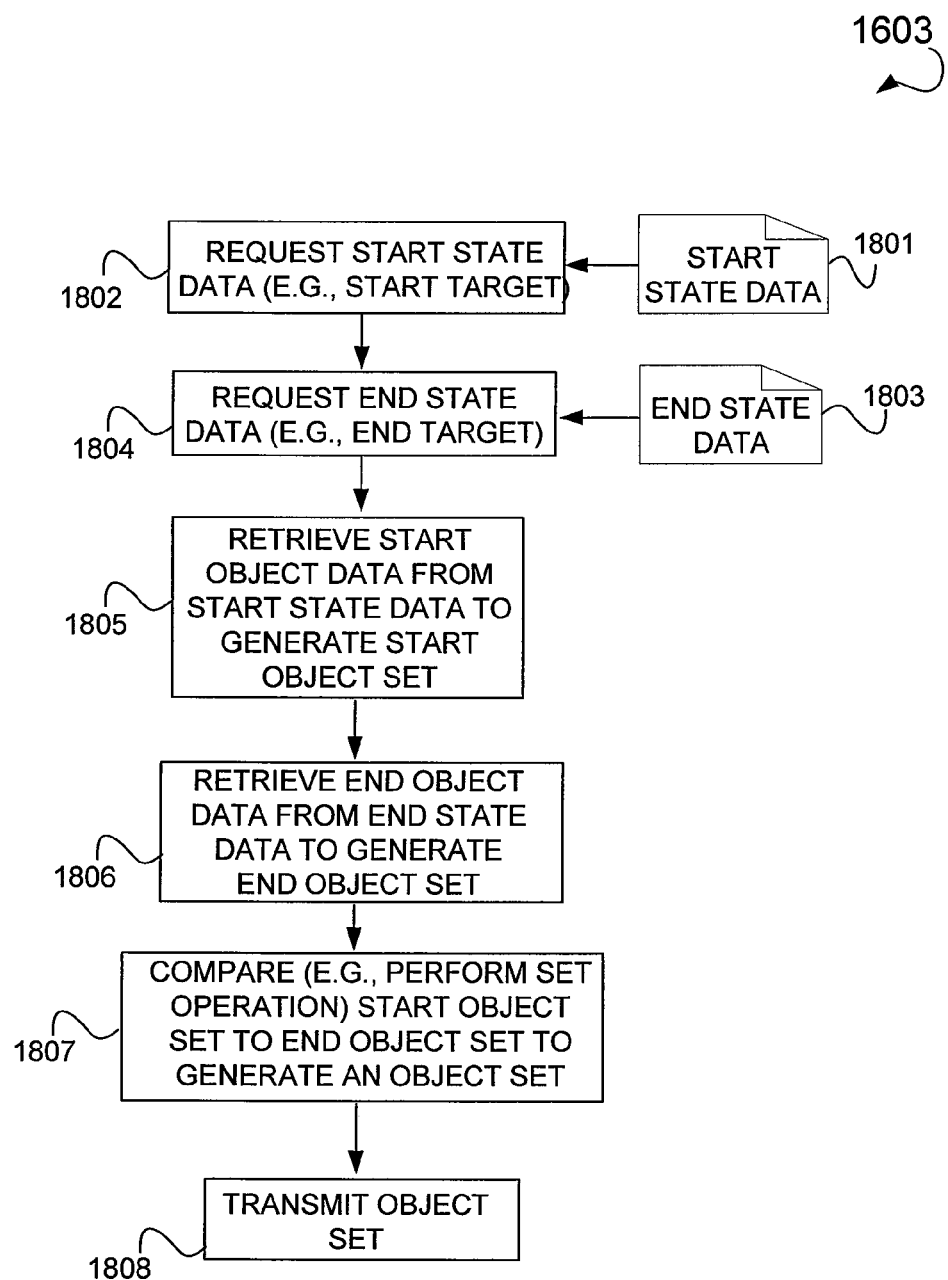
FIG. 18 is a flow chart illustrating the execution of operation, according to an example embodiment, to perform a state comparison between a first state and a second state to determine default transitions associated with objects of an end state.

FIG. 18 is a flow chart illustrating the execution of operation 1603. Additionally, in some example embodiments, FIG. 18 shows the execution of operation 1705 shown in FIG. 17. Shown is an operation 1802 that, when executed, requests start state data in the form of start state data 1801. Further, an operation 1804 is executed that requests end state data in the form of end state data 1803. The start state data 1801 may reflect data regarding a start target such as, for example, the object 306 shown in FIG. 3 denoted by start target 319 shown in FIG. 3. The end state data 1803 may include data regarding the object 306 denoted by the end target 323 shown in FIG. 3. Operation 1805 is executed to retrieve start object data from the start state data to generate a start object set. An operation 1806 is executed to retrieve end object data from the end state data to generate an end object set. An operation 1807 is executed to compare the start object set to the end object set to generate an object set. This comparison may take the form of finding objects in the end state that are not in the start state through the use of set operations. These set operations may include union (U), intersection (∩), set difference (–), Cartesian product (x), or some other suitable set operation. Transitions may be retrieved for these objects via the execution of operation 1605 shown in FIG. 16 or 1707 shown in FIG. 17. The object set is transmitted through the execution of operation 1808.

In some example embodiments, operation 1807 may be used to generate an object set through the use of set operations. For example, given a set A={w, x, z} and a set B={w, m, n}, where w, x, z, m, and n are objects with associated properties in the form of visual effects a set difference operation may be applied. The result of the application of this set difference operation may be an object set C that includes the objects m and n (e.g., C={m,n}). Each of these objects m and n have visual effects associated with them that are displayed by default. Further, a union operation could be applied to set A and B, in lieu of a set difference operation, such that an object set D is generated that includes x, z, m, and n (e.g., D={x, z, m, n}).

In some example embodiments, operation 1807 may be used to generate an object set through the use of conditional operations, or case statements. For example, a conditional statements could be implemented that include the following form:

If an object exists in the start state but not the end state, create a fade effect;
If the object has moved between the states, create a move effect;
If the object has grown or shrunk between states, create a resize effect;
If another property has changed between the states, create an animate property effect.

As referenced herein, a start state may be a start target, and an end state may be an end target. The logic of the above example conditional statements may be implemented as case statement.

Figure 19:
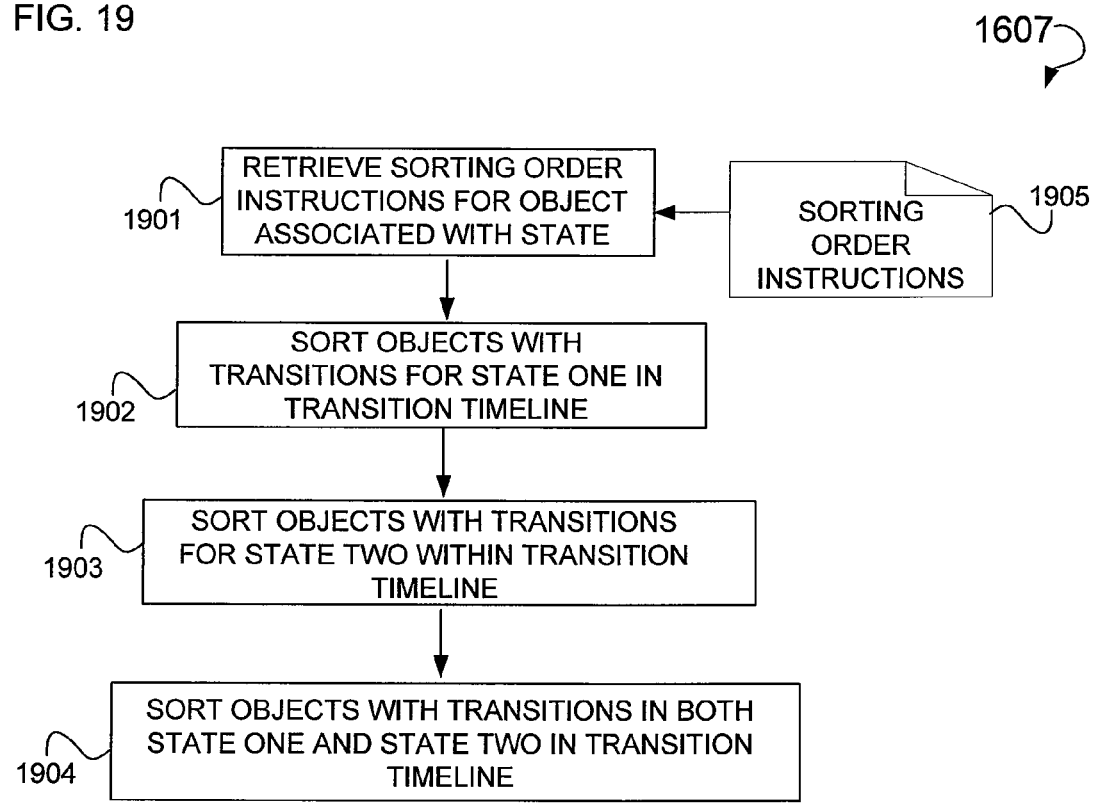
FIG. 19 is a flow chart illustrating the execution of operation, according to an example embodiment, is executed that sorts retrieved transitions for display within the transition timeline

FIG. 19 is a flow chart illustrating the execution of operation 1607. In some example embodiments, FIG. 19 illustrates the execution of operation 1709 shown in FIG. 17. Illustrated is an operation 1901 that, when executed, retrieves sorting order instructions 1905 for objects associated with a state. Operation 1902 is executed to sort objects with transitions for a first state (e.g., state one) in a transition timeline display area 308 shown in FIG. 3, where the first state correspond to the previously illustrated page 1. Further, an operation 1903 is executed to sort objects with transitions for a second state (e.g., state two) within a transition timeline display area 308. This second state may correspond to the previously illustrated page 2. Operation 1904 is executed to sort objects with transitions in both the first and second states. The particular sorting order is denoted by operations 1902 through 1904 and may be implemented as a sorting preset. This sorting preset may be determined by, for example, a user 101 shown in FIGS. 1-2.

Figure 20:
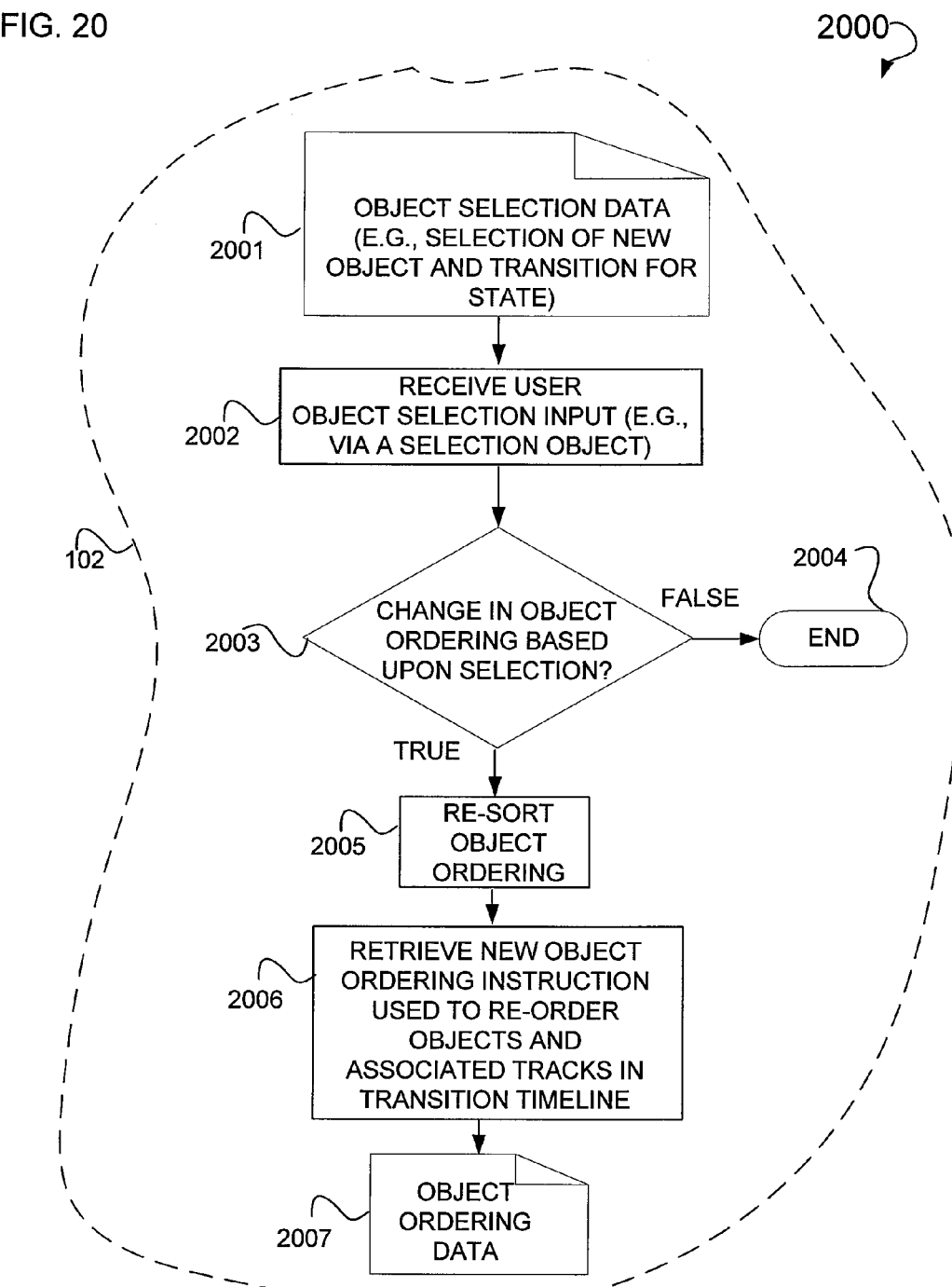
FIG. 20 is a flow chart illustrating the execution of a method, according to an example embodiment, used to pre-sort a particular track list and the associated tracks included within this list.

FIG. 20 is a flow chart illustrating the execution of a method 2000 used to pre-sort a particular track list and the associated tracks included within this list. (See e.g., tracks 309 through 315 shown in FIG. 3.) Shown are various operations 2002 through 2006 that may be executed by one of the devices 102. Operation 2002 is executed that receives user object selection data 2001. This user object selection data 2001 may be generated through the execution of a selection object. (See e.g., default selection object 403 shown in FIG. 4.) A decisional operation 2003 is executed to determine whether a change in object ordering has occurred based upon the execution of the selection object. In cases where decisional operation 2003 evaluates to "false," a termination operation 2004 is executed. In cases where decisional operation 2003 evaluates to "true," an operation 2005 is executed. Operation 2005, when executed, re-sorts the object ordering such that the tracks within the track list are re-sorted to reflect the sorting order as dictated by the sorting presets. Operation 2006 is executed to retrieve new object ordering instructions used to re-order objects, and their associated tracks, within the transition timeline display area 308 shown in FIG. 3. These ordering instructions may be provided as object ordering data 2007, and as part of the transition timeline data 110 shown in FIG. 1 or 205 shown in FIG. 2.

Figure 21:
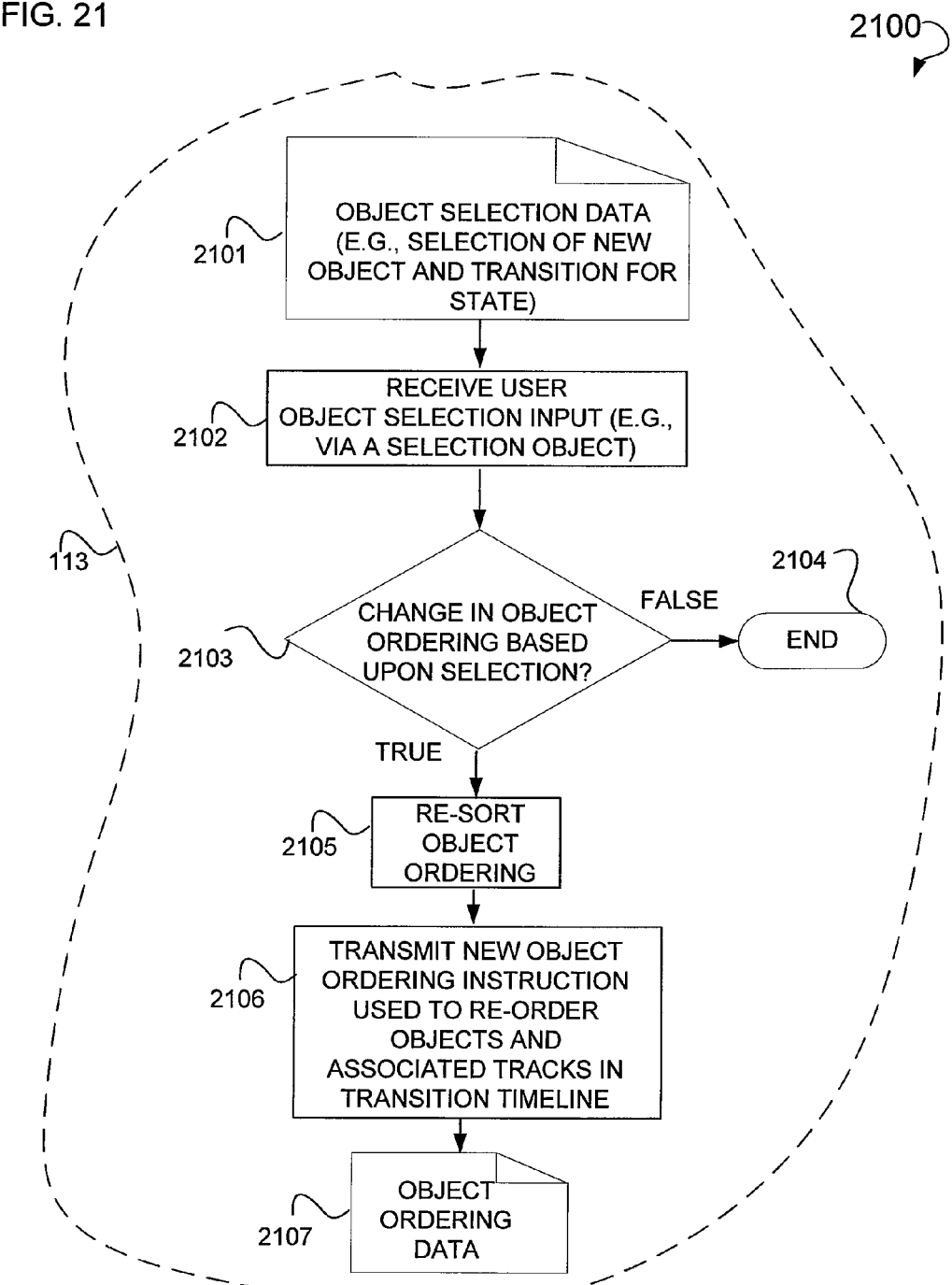
FIG. 21 is a flow chart illustrating a method, according to an example embodiment, executed by the GUI builder server to re-sort the various tracks within a track list.

FIG. 21 is a flow chart illustrating example method 2100 executed by the GUI builder server 113 to re-sort the various tracks within a track list. Shown are various operations 2102 through 2107 that may be executed by the GUI builder server 113. An operation 2102 is executed that receives user selection input in the form of object selection data 2101. This object selection data 2101 may be generated through the execution of a selection object such as, for example, the default selection object 403 shown in FIG. 4. A decisional operation 2103 is executed that determines whether a change in an object ordering has occurred based upon a selection. In cases where a decisional operation 2103 evaluates to "false," a termination operation 2104 is executed. In cases where decisional operation 2103 evaluates to "true," an operation 2105 is executed. This operation 2105, when executed, re-sorts an object ordering such that the tracks within a track list (e.g., tracks 309 through 315 shown in FIG. 3) may be re-ordered. This re-ordering may be based upon certain sorting presets. An operation 2106 is executed that transmits a new object ordering instruction to be used to re-order objects in the tracks with which they are associated within a transition timeline. Specifically, operation 2106, when executed, generates object ordering data 2107 that is provided as a part of the transition timeline data 115 shown in FIG. 1, or 203 shown in FIG. 3.

Example Database

Some embodiments may include the various databases (e.g., 109, and 114) being relational databases, or, in some cases, On Line Analytic Processing (OLAP)-based databases. In the case of relational databases, various tables of data are created and data is inserted into and/or selected from these tables using SQL or some other database-query language known in the art. In the case of OLAP databases, one or more multi-dimensional cubes or hyper cubes, including multidimensional data from which data is selected from or inserted into using a Multidimensional Expression (MDX) language, may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization or optimization algorithm known in the art.

Figure 22:
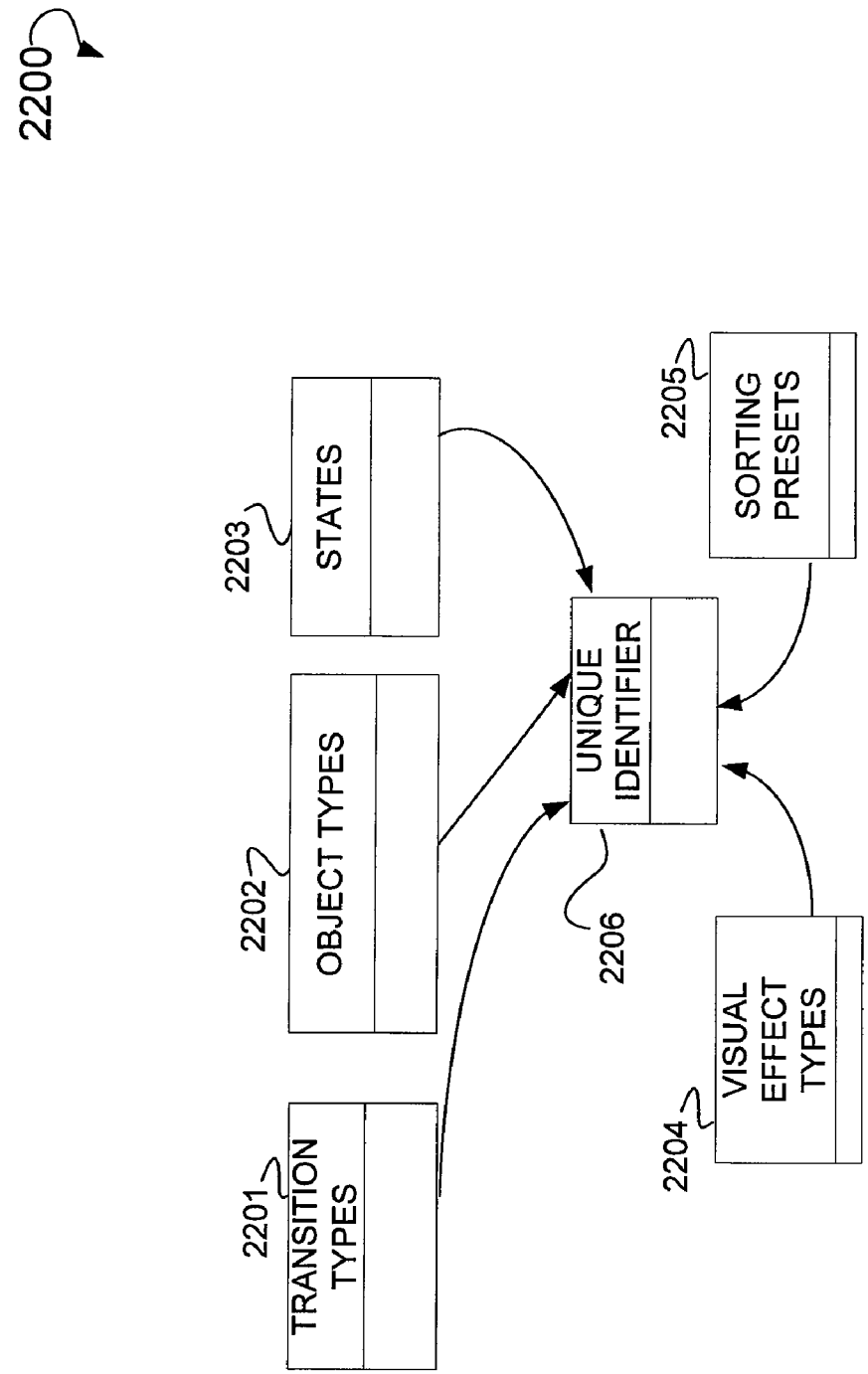
FIG. 22 is a Relational Data Schema (RDS), according to an example embodiment, illustrating various database tables.

FIG. 22 is an RDS 2200 illustrating various tables that may be used within a relational data schema. Shown is a table 2201 that includes transition types. These transition types may be a flag or other boolean value that may be used to denote whether a visual effect in the form of a transition is to be a default associated with an object. A boolean, XML or other suitable data type is used to store the data within the table 2201. A table 2202 is shown that includes object types. These object types may be objects that are user defined, or computer system defined and may be stored as an XML, a Binary Large Object (BLOB), or some other suitable data type. A table 2203 is shown that includes states. These states may be stored as an XML, a BLOB, or some other suitable data type. Further, a table 2204 is shown that includes visual effects types. These visual effects types may include the previously referenced move, fade in, fade out, wipe, resize, or some other suitable visual effect type. These visual effects types may be stored as an XML data type. Further, a table 2205 is shown that includes sorting presets. These sorting presets may include a particular sorting order, as defined by, a user 101. This sorting order may denote which tracks are to appear first within a track list. This track list is displayed as a part of a transition timeline display area. This sorting order may be denoted via an integer, XML, or other suitable data type. A table 2206 is shown that includes unique identifier information. This unique identifier information may be used to uniquely identify the various entries in the tables 2001 through 2005. This unique identifier may be stored as an integer data type.

Distributed Computing Components and Protocols

Some example embodiments may include remote procedure calls being used to implement one or more of the above-illustrated operations or components across a distributed programming environment. For example, a logic level may reside on a first computer system that is located remotely from a second computer system including an interface level (e.g., a GUI). These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components included therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

A Computer System

Figure 23:
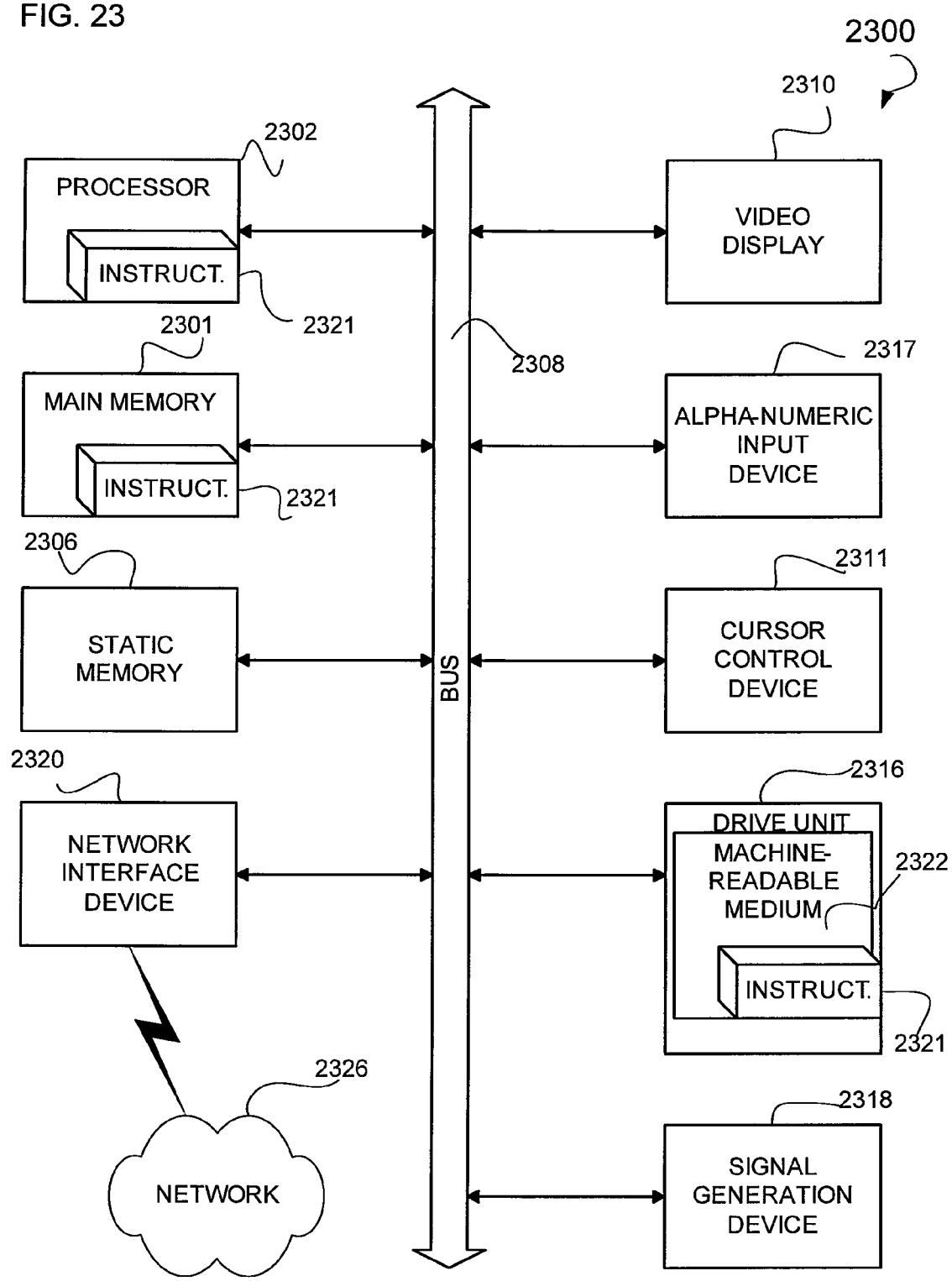
FIG. 23 shows a diagrammatic representation of a machine in the form of a computer system, according to an example embodiment, that executes a set of instructions to perform any one or more of the methodologies discussed herein.

FIG. 23 shows a diagrammatic representation of a machine in the example form of a computer system 2300 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a Personal Computer (PC), a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 2300 includes a processor 2302 (e.g., a CPU, a Graphics Processing Unit (GPU) or both), a main memory 2301, and a static memory 2306, which communicate with each other via a bus 2308. The computer system 2300 may further include a video display unit 2310 (e.g., a Liquid Crystal Display (LCD) or a Cathode Ray Tube (CRT)). The computer system 2300 also includes an alpha-numeric input device 2317 (e.g., a keyboard), a User Interface (UI) (e.g., GUI) cursor controller 2311 (e.g., a mouse), a drive unit 2316, a signal generation device 2318 (e.g., a speaker) and a network interface device (e.g., a transmitter) 2320.

The disk drive unit 2316 includes a machine-readable medium 2322 on which is stored one or more sets of instructions and data structures (e.g., software 2321) embodying or used by any one or more of the methodologies or functions illustrated herein. The software instructions 2321 may also reside, completely or at least partially, within the main memory 2301 and/or within the processor 2302 during execution thereof by the computer system 2300, the main memory 2301 and the processor 2302 also constituting machine-readable media.

The instructions 2321 may further be transmitted or received over a network 2326 via the network interface device 2320 using any one of a number of well-known transfer protocols (e.g., Hyper Text Transfer Protocol (HTTP), Secure Hyper Text Transfer Protocol (HTTPS)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media, and carrier wave signals.

In some example embodiments, the system and method as illustrated herein may be used to validate documents, where the authentication of the content of the document and the author of the document may be required. This document may be, for example, a university transcript, birth certificate, or other suitable document.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
displaying a first visual representation of a set of object properties of a plurality of objects, and a second visual representation of a set of object properties of the plurality of objects, each object of the plurality of objects having a property;
receiving input selecting an object of the plurality of objects having the property, the property displayed as a transition of the selected object from the first visual representation to the second visual representation;
sorting the plurality of objects based upon the selected object to create a sorted plurality of objects; and
generating transition timeline data that includes the sorted plurality of objects, wherein generating the transition timeline data includes transmitting data representative of the received input via a network to a server process and receiving the transition timeline data in response thereto.

2. The computer implemented method of claim 1, wherein each object of the plurality of objects comprises at least one of a component, a widget, user interface control, a layer, a group, a graphic artwork, text, or a path.

3. The computer implemented method of claim 1, wherein the transition timeline data includes at least one track providing a representation of a transition of an object from the first visual representation of the set of object properties to the second visual representation of the set of object properties.

4. The computer implemented method of claim 3, wherein the track includes at least one of an effect bar, a start target, or an end target.

5. The computer implemented method of claim 1, wherein the property includes at least one of a move effect, a wipe effect, a resize effect, a fade-in effect, an auditory effect, or a fade-out effect.

6. The computer implemented method of claim 1, further comprising displaying the transition timeline data as part of a transition timeline display area, the transition timeline display area including at least one of the first visual representation, the second visual representation, the plurality of objects, or the property.

7. The computer implemented method of claim 1, wherein the transition of the selected object from the first visual representation to the second visual representation is represented as occurring over time.

8. The computer implemented method of claim 1, wherein the transition of the selected object from the first visual representation to the second visual representation is represented as occurring at a completion of an event.

9. A computer implemented method comprising:
receiving, via a network from a client device, a transition selection identifying a plurality of objects and an associated property for each object of the plurality of objects;
associating at least one set of object properties with each object of the plurality of objects;
organizing the plurality of objects into transition timeline data; and
transmitting, via the network to the client device, the transition timeline data.

10. The computer implemented method of claim 9, wherein the property is represented within the transition timeline data as a transition.

11. The computer system of claim 9, wherein the organizing includes sorting each object of the plurality of objects into a sorting order based upon the association with the at least one set of object properties.

12. The computer implemented method of claim 9, further comprising:
receiving an additional transition selection identifying an association of the property with each object of an additional plurality of objects; and
sorting each object of the additional plurality of objects based upon the additional transition selection.

13. A computer system comprising:
a display to display a first visual representation of a set of object properties of a plurality of objects, and a second visual representation of a set of object properties of the plurality of objects, each object of the plurality of objects having a property;
an input receiver to receive input selecting an object of the plurality of objects having the property, the property displayed as a transition of the selected object from the first visual representation to the second visual representation;
a sorting engine to sort the plurality of objects based upon the selected object to create a sorted plurality of objects; and
a transition timeline engine to generate transition timeline data that includes the sorted plurality of objects, wherein the transition timeline engine in generating the transition timeline data transmits data representative of the received input via a network to a server process and receives the transition timeline data in response thereto.

14. The computer system of claim 13, wherein each object of the plurality of objects comprises at least one of a component, a widget, user interface control, a layer, a group, a graphic artwork, text, or a path.

15. The computer system of claim 13, wherein the transition timeline data includes at least one track providing a representation of a transition of an object from the first visual representation of the set of object properties to the second visual representation of the set of object properties.

16. The computer system of claim 15, wherein the track includes at least one of an effect bar, a start target, or an end target.

17. The computer system of claim 13, wherein the property includes at least one of a move effect, a wipe effect, a resize effect, a fade-in effect, an auditory effect, or a fade-out effect.

18. The computer system of claim 13, further comprising an additional display to display the transition timeline data as part of a transition timeline display area, the transition timeline display area including at least one of the first visual representation, the second visual representation, the plurality of objects, or the property.

19. The computer system of claim 13, wherein the transition of the selected object from the first visual representation to the second visual representation is represented as occurring over time.

20. The computer system of claim 13, wherein the transition of the selected object from the first visual representation to the second visual representation is represented as occurring at a completion of an event.

21. A computer system comprising:
a receiver to receive, via a network from a client device, a transition selection identifying a plurality of objects and an associated property for each object of the plurality of objects;
an association engine to associate at least one set of object properties with each object of the plurality of objects;
a transition timeline organization engine to organize the plurality of objects into transition timeline data; and
a transmitter to transmit, via the network to the client device, the transition timeline data.

22. The computer system of claim 21, wherein the property is represented within the transition timeline data as a transition.

23. The computer system of claim 21, wherein the organizing includes sorting each object of the plurality of objects into a sorting order based upon the association with the at least one set of object properties.

24. The computer system of claim 21, further comprising:
an additional receiver to receive an additional transition selection identifying an association of the property with each object of an additional plurality of objects; and
a sorting engine to sort each object of the additional plurality of objects based upon the additional transition selection.

25. A non-transitory machine-readable medium comprising instructions, which when implemented by one or more machines, cause the one or more machines to perform the following operations:
display a first visual representation of a set of object properties of a plurality of objects, and a second visual representation of a set of object properties of the plurality of objects, each object of the plurality of objects having a property;
receive input selecting an object of the plurality of objects having the property, the property displayed as a transition of the selected object from the first visual representation to the second visual representation;
sort the plurality of objects based upon the selected object to create a sorted plurality of objects; and
generate transition timeline data that includes the sorted plurality of objects, wherein generating the transition timeline data includes transmitting data representative of the received input via a network to a server process and receiving the transition timeline data in response thereto.

* * * * *